United States Patent [19]

Hochschild et al.

[11] Patent Number: 5,805,589
[45] Date of Patent: *Sep. 8, 1998

[54] CENTRAL SHARED QUEUE BASED TIME MULTIPLEXED PACKET SWITCH WITH DEADLOCK AVOIDANCE

[75] Inventors: Peter Heiner Hochschild, New York; Monty Montague Denneau, Brewster, both of N.Y.

[73] Assignee: International Business Machines Corporation, Armonk, N.Y.

[*] Notice: The term of this patent shall not extend beyond the expiration date of Pat. No. 5,546,391.

[21] Appl. No.: 608,017

[22] Filed: Mar. 4, 1996

Related U.S. Application Data

[63] Continuation of Ser. No. 424,824, Apr. 19, 1995, Pat. No. 5,546,391, which is a continuation of Ser. No. 27,906, Mar. 4, 1993, abandoned.

[51] Int. Cl.$^6$ .................................................... H04L 12/28
[52] U.S. Cl. ......................... 370/389; 370/412; 370/413; 370/428
[58] Field of Search ..................................... 370/389, 395, 370/412, 413, 414, 415, 416, 417, 418, 422, 428, 444, 449, 455; 340/825.51

[56] References Cited

U.S. PATENT DOCUMENTS

| | | | |
|---|---|---|---|
| 5,050,161 | 9/1991 | Golestani | 370/230 |
| 5,121,383 | 6/1992 | Golestani | 370/235 |
| 5,140,584 | 8/1992 | Suzuki | 370/235 |
| 5,212,773 | 5/1993 | Hillis | 395/200 |
| 5,268,900 | 12/1993 | Hluchyj et al. | 370/429 |
| 5,274,642 | 12/1993 | Widjaja et al. | 370/411 |

*Primary Examiner*—Dang Ton
*Assistant Examiner*—Phirin Sam
*Attorney, Agent, or Firm*—Floyd A. Gonzalez; James E. Murray

[57] ABSTRACT

Specifically, a central queue based packet switch, illustratively an eight-way router, that advantageously avoids deadlock and an accompanying method for use therein. Specifically, each packet switch ($25_1$) contains input port circuits (310) and output port circuits (380) inter-connected through two parallel paths: a multi-slot central queue (350) and a low latency by-pass; the latter cross-point switching matrix (360). The central queue has one slot dedicated to each output port to store a message portion ("chunk") destined for only that output port with the remaining slots being shared for all the output ports and dynamically allocated thereamong, as the need arises. Only those chunks which are contending for the same output port are stored in the central queue; otherwise, these chunks are routed to the appropriate output ports through the cross-point switching matrix.

20 Claims, 12 Drawing Sheets

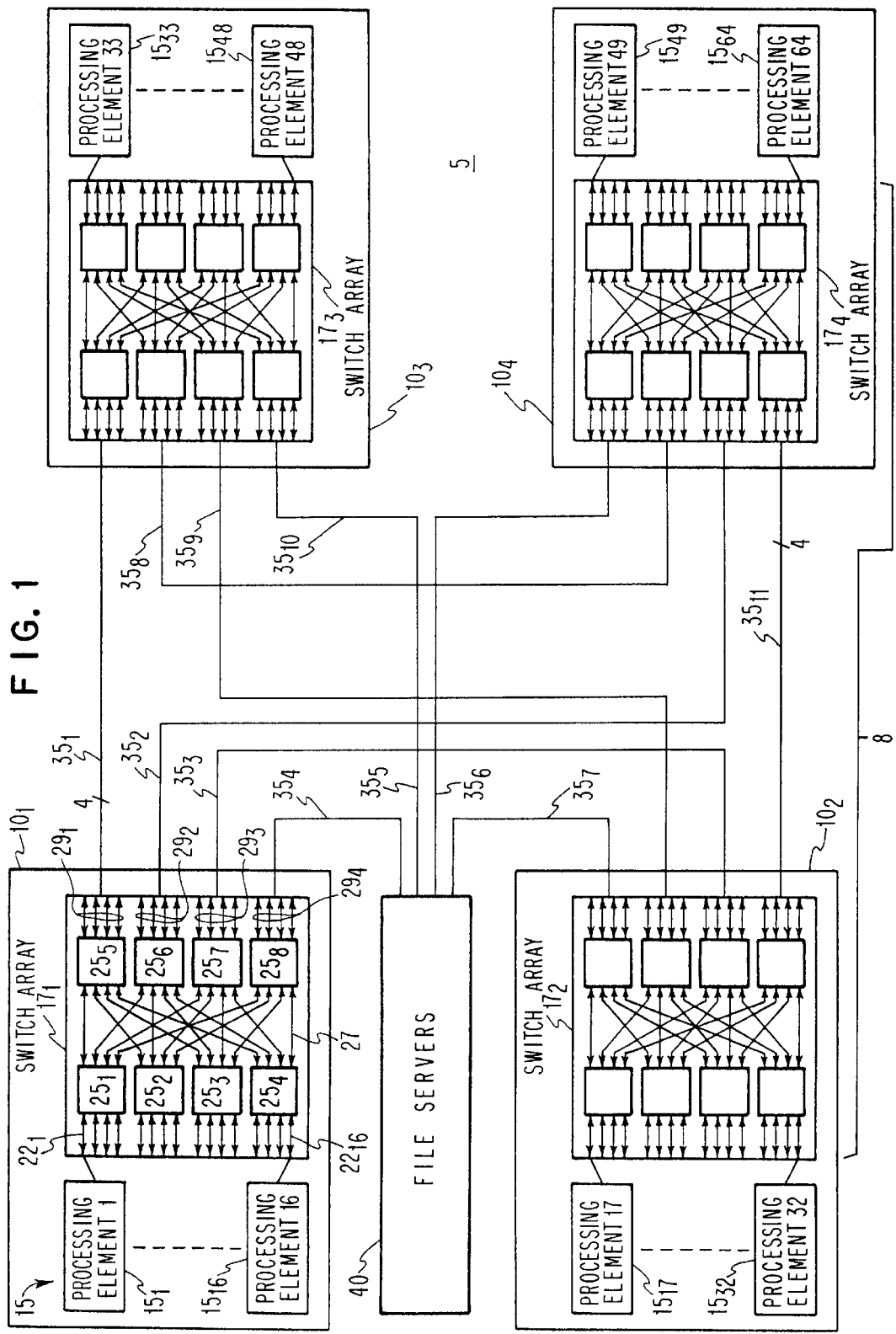

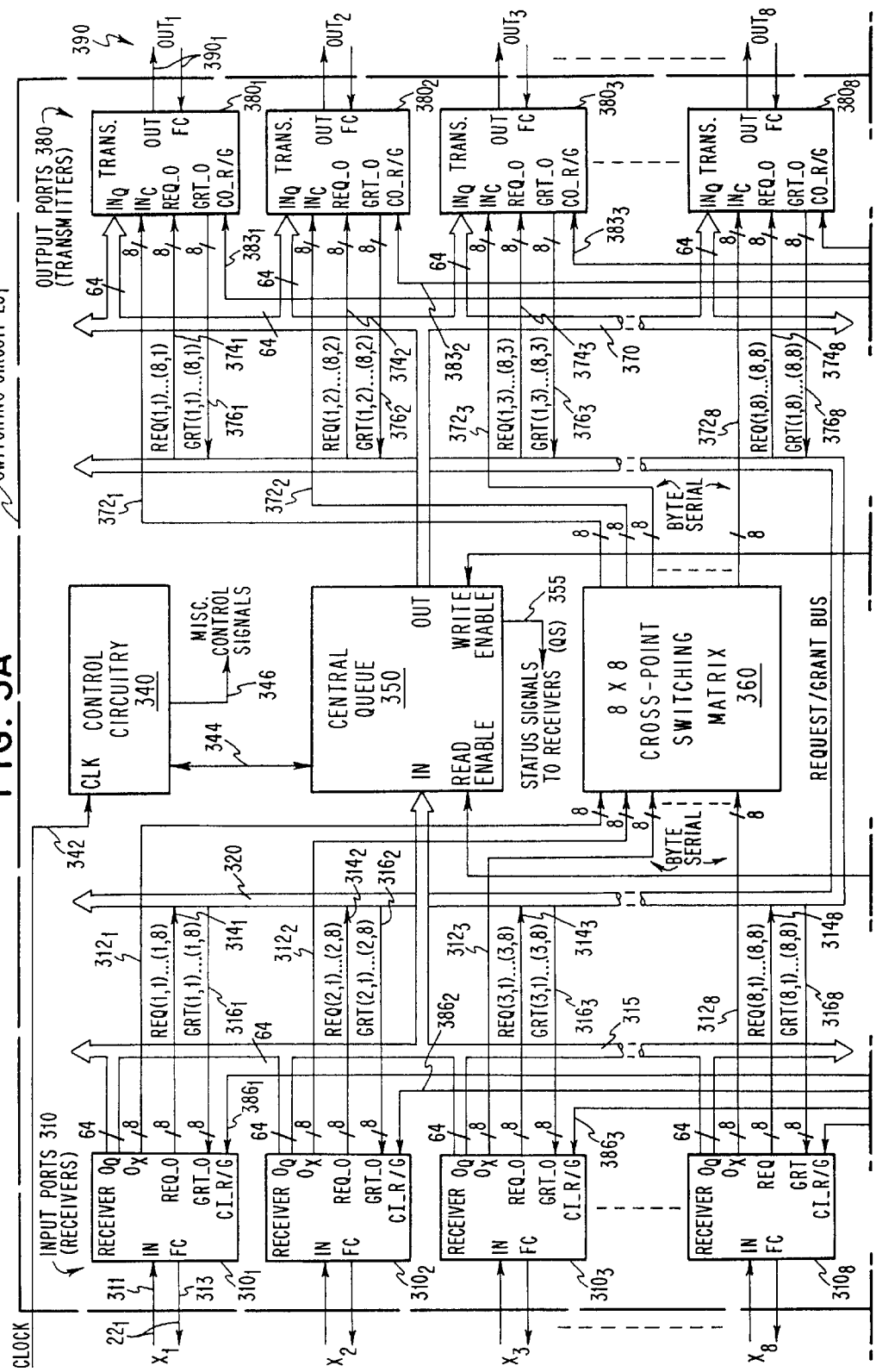

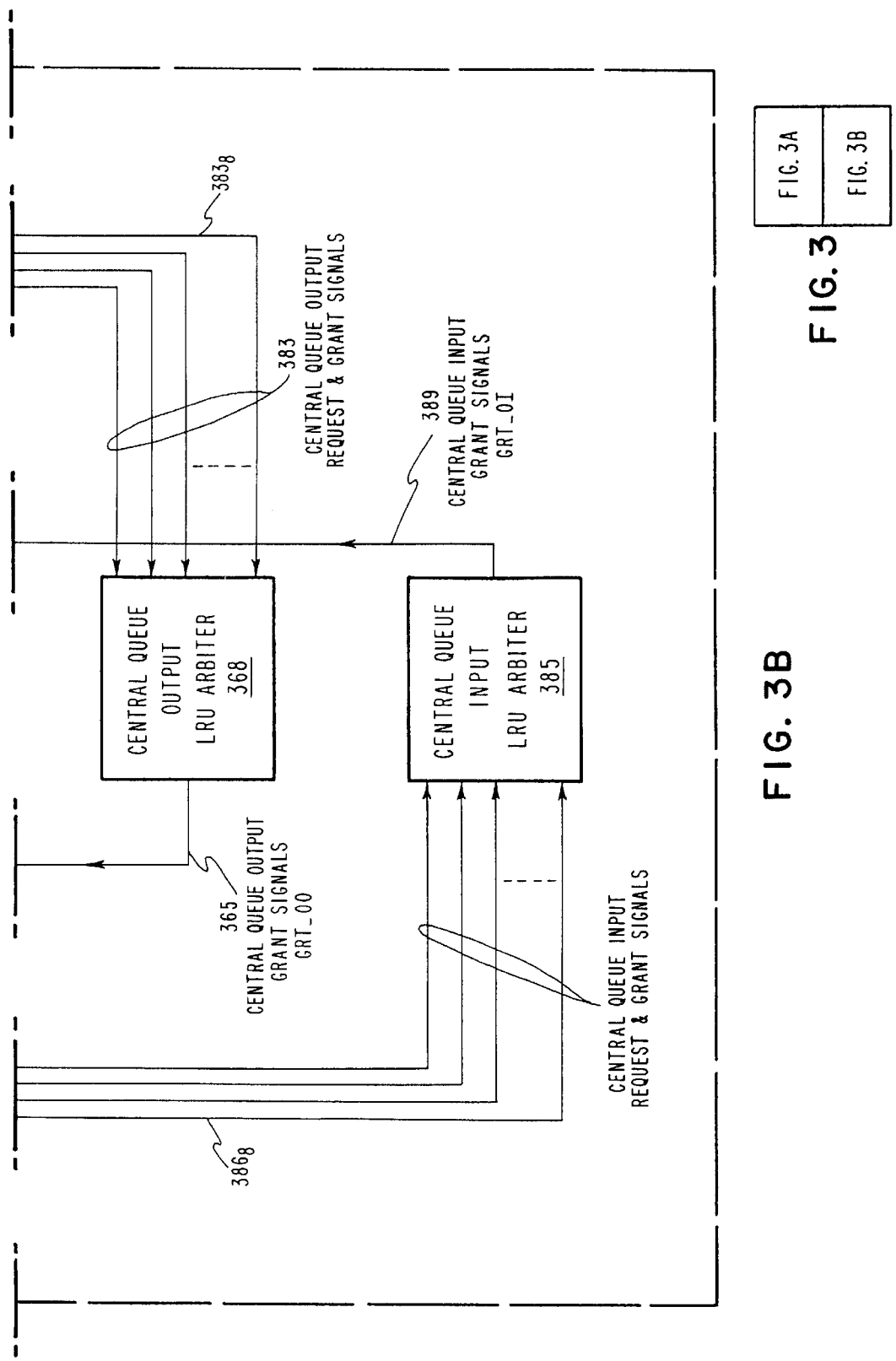

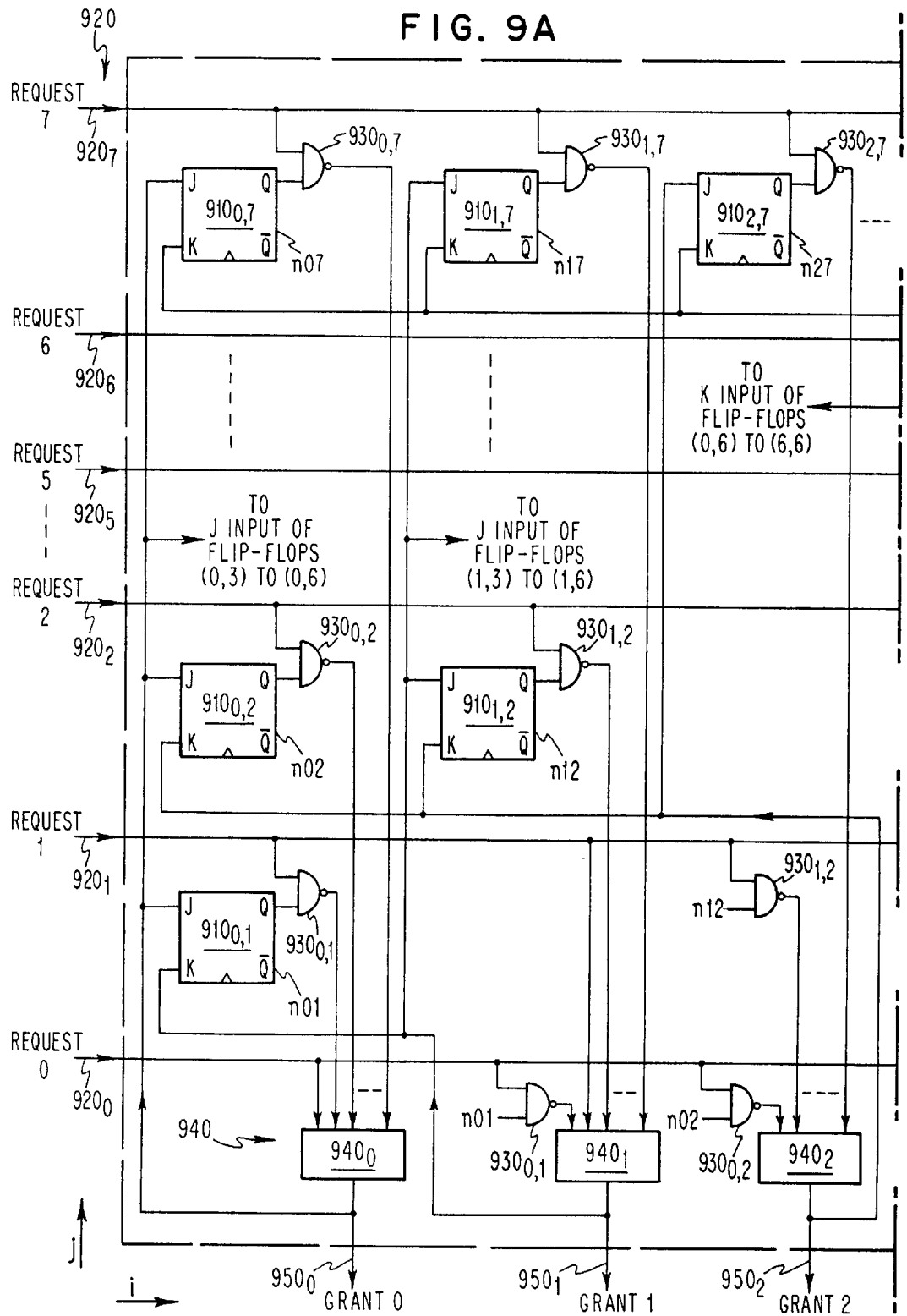

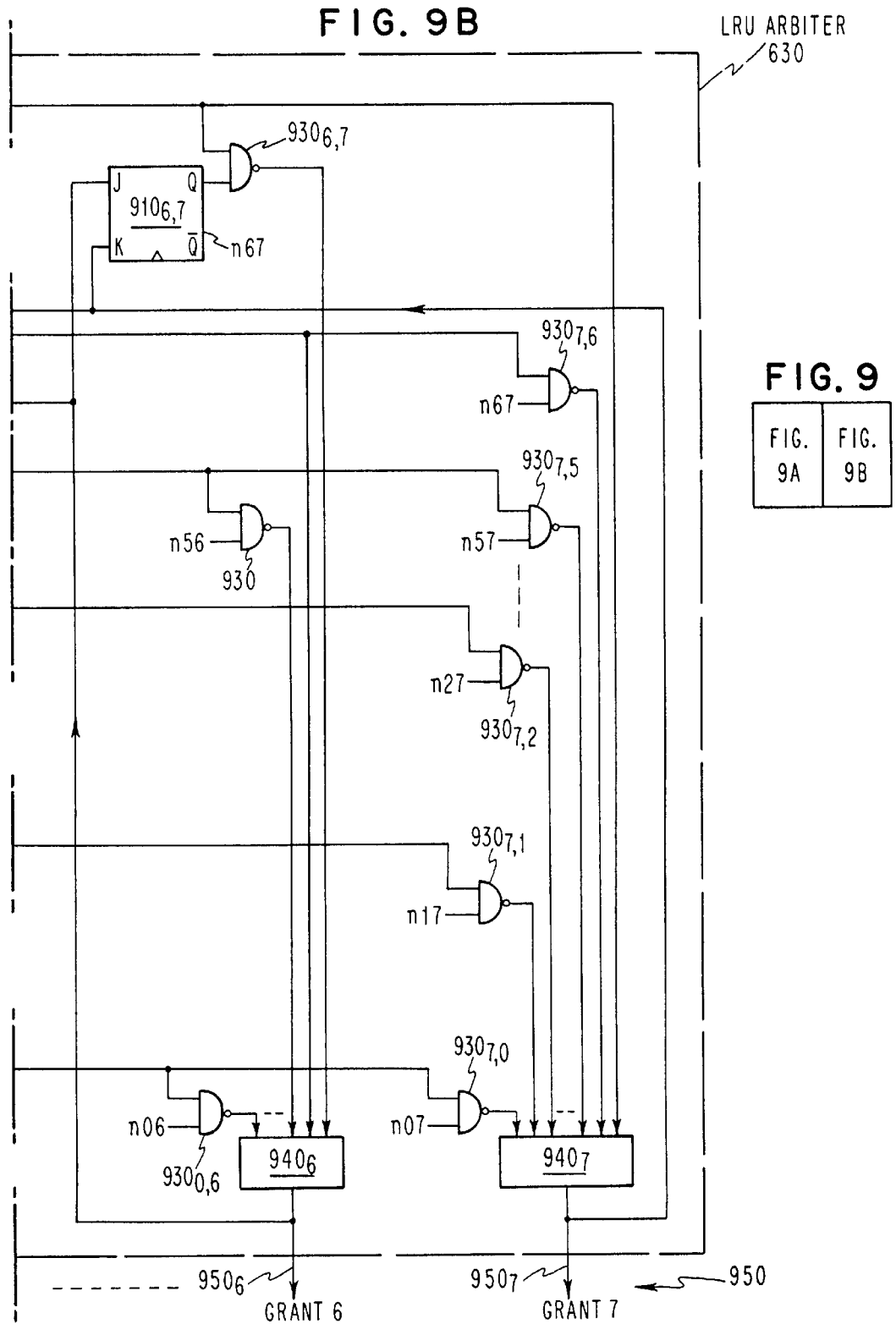

CENTRAL SHARED QUEUE BASED TIME MULTIPLEXED PACKET SWITCH WITH DEADLOCK AVOIDANCE

This application is a continuation of application Ser. No. 08/424,824 filed Apr. 19, 1995, now U.S. Pat. No. 5,546,391 which is a continuation of application Ser. No. 08/027,906 filed on Mar. 4, 1993, now abandoned.

BACKGROUND OF THE DISCLOSURE

1. Field of the Invention

The invention relates to apparatus for a central queue based packet switch, illustratively an eight-way router, that advantageously avoids deadlock and an accompanying method for use therein. The invention is particularly, though not exclusively, suited for use within a packet network in a massively parallel processing system.

2. Description of the Prior Art

With the continual evolution and commercial availability of increasingly powerful, sophisticated and relatively inexpensive microprocessors, distributed, and particularly massively parallel, processing is being perceived in the art as an increasingly attractive vehicle for handling a wide spectrum of applications, such as transaction processing, heretofore processed through conventional mainframe computers.

In general, distributed processing involves extending a processing load across a number of separate processors, all collectively operating in a parallel or pipelined manner, with some type of interconnection scheme being used to couple all of the processors together in order to facilitate message passing and data sharing thereamong. In the past, distributed processing architectures, of which many variants exist, generally entailed use of a relatively small number of interconnected processors, typically two and often less than ten separate highly sophisticated central processing units as would be used in a traditional mainframe or super-mini-computer, in which these processors would be interconnected either directly through, e.g., an inter-processor bus, or indirectly through, e.g., a multi-ported shared memory, such as a shared digital access storage device (DASD), or other communication path. By contrast, in massively parallel processing systems, a relatively large number, often in the hundreds or even thousands, of separate, though relatively simple, microprocessor based processing elements is interconnected through a communications fabric formed of a high speed network in which each such processing element appears as a separate node on the network. In operation, the fabric routes messages, typically in the form of packets, from any one of these processing elements to another to provide communication therebetween. Each of these processing elements typically contains a separate microprocessor and its associated support circuitry, the latter being typified by, for example, random access memory (RAM), for program and data storage, and input/output (I/O) circuitry. Based upon the requirements of a particular system, each element may also contain read only memory (ROM), to store initialization ("boot") routines as well as configuration information, and/or other circuitry.

Each distributed processing element, particularly in a massively parallel processing system, also contains a communication sub-system that interfaces that element to the communications fabric. Within each element, this sub-system is formed of appropriate hardware circuitry, such as a communications interface within the I/O circuitry, and associated controlling software routines, the latter being invoked by an application executing within that one element in order to communicate with any other such processing element in the system.

A primary and continuing goal in the design of any processing environment is to improve overall system performance. Given the growing importance of massively parallel processing systems, we will direct the remainder of this discussion to these particular systems.

The overall performance of a massively parallel processing system tends to be heavily constrained by the performance of the underlying network used therein. Generally speaking, if the network is too slow and particularly to the point of adversely affecting overall system throughput, it may sharply reduce the attractiveness of using a massively parallel processing system in a given application.

Specifically, in such a system, each processing element executes a given portion of an application. As such and owing to the interdependent nature of the processing among the elements, each processing element must be able to transfer data to another such element as required by the portions of the application then executing at each of these elements. Generally, if any one processing element (i.e. the "destination" element) requests data from another such element (i.e. the "originating" element), the destination element remains idle until it receives a message containing the needed data transmitted by the originating element, at which point the destination element once again commences application processing. Not surprisingly, a finite amount of time is required to transport a message containing the request from the destination to the originating processing elements and, in an opposite direction, a responding message containing the requested data. This time unavoidably injects a degree of latency into that portion of application executing at the destination element. Since most processing elements in the system function as destination elements for corresponding portions of the application, then, if this communication induced latency is too long, system throughput may noticeably diminish. This, in turn, will significantly and disadvantageously degrade overall system performance. To avoid this, the network needs to pass each message between any two communicating processing elements as quickly as possible in order to reduce this latency. Moreover, given the substantial number of processing elements that is generally used within a typical massively parallel processing system and the concomitant need for any one element in this system to communicate at any one time with any other such element, the network must also be able to simultaneously route a relatively large number of messages among the processing elements.

In a massively parallel processing environment, the network is usually formed of a packet network rather than a circuit switched or other type of network. Inasmuch each inter-processor message itself tends to be relatively short but, at any one time, a very large number of these messages generally needs to be simultaneously routed through the network, packet networks provide the most efficient vehicle to carry these messages, in terms of reduced circuit complexity, and decreased network cost and physical size of the network including its associated switches.

To yield proper system performance, a massively parallel processing system needs to utilize a packet network, and particularly packet switches therein, that can route an anticipated peak load of inter-processor messages with minimal latency.

Unfortunately, in practice, packet switches that possess the requisite performance for use in a massively parallel processing system have proven to be extremely difficult to develop thereby inhibiting the continual advancement and use of such systems.

While various widely differing forms of packet switches exist in the art, one common architecture uses a cross-point matrix. In particular, such a switch utilizes multiple, e.g. "m", input ports and multiple, e.g. "n", output ports (where "m" and "n" are both integers), all of which are interconnected through an m-by-n matrix of cross-point connections. Fortunately, small cross-point type switches tend to be relatively simple and cost-effective to implement. Unfortunately, cross-point switches suffer primarily from input blocking and secondarily, and not particularly relevant here, to a need to quickly resolve output contention. If not for these serious idiosyncrasies and particularly input blocking, cross-point based switches would be preferred over other more complex and costly switch architectures that do not suffer from these particular affects.

In particular and operationally speaking, incoming packets contain a header field with an embedded routing code and a length field, an information field generally containing requested data, and finally a trailing field that may contain an error correcting code field as well as various message delimiters. The routing code generally specifies the particular input port on the switch at which the message originates and the particular output port on the switch for which the message is destined. The length field specifies the length, typically in bytes, of the entire message. The routing code and the length fields are generated by input circuitry associated with the network and appended, as a prefix, to the message prior to the message being routed therethrough. Input circuitry within the switch reads the routing code and then sets appropriate cross-point connections within the switch in order to link the desired input and output ports of the switch and route the message therebetween. Once the link is established the message is routed through the cross-point matrix, typically on a bit- or byte-serial basis, from the originating input port to the destination output port. The routing code for this particular switch is simply removed from the message and discarded by the circuitry in the destination output port of the switch. The remainder of the routing code is that which will be used to route the message through successive downstream switches in the network. Once the message is fully routed through the switch, the cross-point connections are reset to collapse, i.e. tear down, the link then existing between the input and output ports. The error correcting code field contains a value obtained by processing the information field through a predetermined error correcting polynomial, such as a known cyclic redundancy code (CRC), to yield a resulting value. Once the message has been routed through the switch, the information field is processed within the destination output port to reconstruct this value. The reconstructed value is then compared with the value contained within the trailing field. If the two code values match, then the message has been transported without error through the switch and can be subsequently routed through the next successive switching stage in the network. Alternatively, if a match does not occur, then the message that arrived at the destination output port contains an error. As such, control circuitry within the switch as well as higher level supervisory control circuitry within the network usually requests that this particular message be discarded and a new message containing the corresponding information be re-transmitted through the network.

As described thusfar, this architecture generally functions well if a destination output port on a cross-point based switch is always available to accept a message then situated at an originating input port. However, this availability can not be guaranteed during periods of heavy message traffic. In fact, if the destination output port is then busy and can not accept the message then situated at an originating input port, this message generally waits at the input port, until the output port becomes available, before being routed through the cross-point matrix. In cross-point based switches known in the art, each input port contains a first-in first-out (FIFO) queue to store incoming messages that are to be routed through that port. Though not particularly relevant here, the FIFO queue, by providing input buffering, permits the upstream circuitry and the cross-point switch to operate at different speeds. Messages move through the queue on a serial time ordered basis: the first message entered into the queue reaches the output of the queue and hence is routed through the cross-point matrix before the next successive message in the queue and so forth for all messages then stored in the queue. Unfortunately, if a message at the head of the queue is stalled, due to the unavailability of its destination output port, all successive messages in the queue can not advance through the cross-point matrix. This, in turn, stalls all the messages then residing in the queue. As such, all the messages then stored within this input port are blocked and can not be routed until the message at the head of the queue can be routed. This condition is referred to as "input blocking". Input blocking can become significant during peak traffic loads and hence greatly reduce the throughput of the switch at these times.

Cross-point based packet switches that contain input queues and thus may likely experience significant input blocking are shown in the following U.S. Pat. Nos. 5,140,582 (issued to M. Tsuboi et al on Aug. 18, 1992); 4,947,387 (issued to E. Knorpp et al on Aug. 7, 1990); 4,922,488 (issued to G. Niestegge on May 1, 1990) and 4,752,777 (issued to P. A. Franaszek on Jun. 21, 1988 and assigned to the present assignee hereof). Given the susceptibility of such switches to input blocking, cross-point packet switches that contain input queues are generally not suited for use with high peak traffic loads, and thus have not been appropriate for use in a massively parallel processing environment.

One solution aimed at ameliorating input blocking, and thus increasing message throughput, in an input queue based cross-point switch is described in a co-pending United States patent application from D. W. Prince et al and entitled "Look-Ahead Priority Arbitration System and Method", Ser. No. 07/816,358, filed Dec. 27, 1991 (hereinafter referred to as the "Prince et al application") and assigned to the present assignee hereof. In essence, whenever a message at the head of an input queue is stalled, this solution involves determining whether the next successive message in the queue can then be routed to its associated destination output port. If this next message can be routed, it is routed while the message at the head of the queue remains stalled. By routing messages around a blocked message and hence through an otherwise "blocked" input port, this solution significantly increases the throughput through the switch. Unfortunately, this technique disadvantageously increases the complexity of the circuitry used within each input port. Since a packet switch destined for use in a massively parallel processing system typically contains a relatively large number of input ports, the additional complexity of all the input ports may noticeably increase the cost of the overall system. Furthermore, resources that are expended at input buffers tend to be poorly utilized. In this regard, if, at any given moment, an input port is not experiencing blockage (or contention, as discussed below) for a message situated thereat and destined to a output port, the additional resources incorporated into that input port as taught by the Prince et al application are essentially wasted and can not be used to alleviate blockage (or contention) that might then occur at some other input port.

Output contention occurs whenever two or more input ports simultaneously contain messages at the heads of their respective queues which are to be routed to the same output port. In essence, both messages are contending for the same output port. The switch must decide which one of these messages is to be routed to the output port while the remainder of these messages wait to be routed during a subsequent switching cycle. Inasmuch as various techniques now appear to exist in the art to rapidly resolve output contention, such as within a single clock cycle or concurrently with other tasks inherent in routing a message through a packet switch, output contention resolution no longer appears to be a major factor in limiting the performance of a packet switch, including those destined for use in, e.g., a massively parallel processing environment. In the context of various high speed contention resolution techniques applicable to packet switches designed for asynchronous transfer mode (ATM) switching, see, e.g., U.S. Pat. No. 5,179,552 (issued to H. J. Chao on Jan. 12, 1993) and 5,157,654 (issued to A. Cisneros on Oct. 20, 1992).

Thus, a general need has existed in the art for a packet switch, particularly one suited for use in a massively parallel processing system, that does not appreciably suffer, if at all, from input blocking. Such a switch should also not be unduly complex or costly to implement. In addition, while such a switch would likely require additional resources to ameliorate input blocking, those resources should be used as efficiently as possible and preferably not be dedicated only to a particular input port(s). If such a switch were to be incorporated into a packet network within a massively parallel processing system, the overall throughput of the system should dramatically and cost effectively increase over that heretofore possible in the art thereby advantageously increasing the attractiveness of using such a system in a given processing application.

One such packet switch which was developed by the present assignee and appeared to meet these needs is disclosed in M. Denneau et al, "The Switching Network of the TF-1 Parallel Supercomputer", *Supercomputing*, Winter 1988, pages 7–10. In essence, this packet switch relies on using a number of inter-connected single chip integrated circuit 8-by-8 time divisional uni-directional packet routers. Each of these routers contains eight identical input port circuits (receivers) and eight identical output port circuits (transmitters). Each of the receivers performs four major functions: administering a channel flow-control protocol, buffering incoming messages using a 16-byte internal queue, deserializing incoming messages into 8-byte message portions (hereinafter referred to as "chunks") and decoding message routing information. From each receiver and in the event of contention for a given output port, the 8-byte chunks destined therefor are sent to a central queue. This queue implements a buffered time-multiplexed 8-way router. The queue accepts one message chunk from each receiver on a first-come first-served basis per clock cycle. The central queue is composed of 128 8-byte locations all of which are shared and dynamically allocated according to demand then existing. The central queue stores all of the message chunks until the corresponding transmitter becomes available, at which point the chunks are sent thereto. Within the central queue, the stored messages are organized into eight linked lists with each list associated with a different transmitter. The eight transmitters, one used for each output port, are served by the central queue on a first-come first-serve basis.

As long as chunks are available within the central queue, one of these transmitters is served each clock cycle. Each transmitter accepts message chunks from the central queue, serializes these chunks, buffers the resulting serial information in a 16-byte output queue and then transmits the resulting buffered information to an output channel in accordance with the channel flow control protocol. The router chip also incorporated byte-serial by-pass channels which, whenever an output port is not experiencing any contention, permits messages to pass directly from the receivers to the transmitter for this port with very low latency. Advantageously, use of such a central queue substantially, and generally totally, eliminates blocking, i.e. a message packet at any input port which can not be routed due to the unavailability of its corresponding output port would not block other message packets then queued at the same input port. Furthermore, since the central queue is shared by all the input ports, its utilization tends to be much higher than input port resident buffering schemes.

While this packet switch provided excellent performance in packet routing, it suffered various limitations which, in practice, limited its use in a massively parallel processing system. First, the router chip and a packet network fabricated of these chips is uni-directional in nature. Consequently, it is oftentimes not readily possible to operate a desired portion, e.g. one or more but not all processing racks, of a massively parallel processing system that has such a packet network with a uni-directional-topology without having to disconnect and appropriately re-arrange cables that inter-connect these chips. This, in turn, requires that the entire system be brought "down" in order to upgrade and/or maintain, e.g. test and/or repair, a given portion of the system and then, if necessary, re-cabled accordingly to restore some operative processing capability. Needless to say, this not only adversely affects the processing throughput of the system but also imposes a heavy and unnecessary burden on the system personnel. In contrast, a massively parallel processing system constructed with a bi-directional topology can be readily modularized, with any module(s), such as processing rack or portions thereof, being easily upgraded and/or repaired without any need for re-cabling. However, bi-directional topologies are susceptible to deadlock. Specifically, if for any transmitter sending to a receiver, the corresponding queues on each of the associated router chips, both in the FIFOs in the individual port circuits as well as in the central queues thereof, are each filled with opposing traffic, e.g. all the message chunks on one such FIFO are to be routed in a direction opposite to that of the traffic in the corresponding FIFO, none of this traffic can move. As such, a deadlock condition occurs which then completely prevents any packets from moving between these ports, thereby significantly reducing and possibly halting application processing at the system. Since instantaneous traffic loads can be quite high in a massively parallel processing system, a significant likelihood exists that deadlock with an attendant reduction and/or halt in application processing will occur in a system having a bi-directional topology.

Hence, a specific need now exists in the art for a packet switch that can be used to form a bi-directional packet network suited for use in a massively parallel processing system and, while meeting the above general needs, also does not appreciably suffer, if at all, from deadlock. Such a resulting network, once incorporated into a massively parallel processing system, would be expected to yield a relatively simple and cost-effective system that has a dramatically increased throughput than that attainable in the art, while being modular and easily and readily expandable and maintainable in practice.

SUMMARY OF THE INVENTION

We have invented a switching circuit which advantageously avoids deadlock when used in a bi-directional packet network and thus overcomes the deficiencies known in the art.

Our inventive switching circuit contains typically eight input port circuits and eight output port circuits all interconnected through two parallel paths: a multi-slot central queue and a low latency by-pass path; the latter being a cross-point switching matrix.

In accordance with our inventive teachings, the central queue, rather than having all its slots shared among all the output ports in a switching circuit, is apportioned to contain one (or more) slots that is dedicated (reserved) to each output port with the remaining slots being shared among all the output ports. In a preferred embodiment of our invention, only one slot needs to be dedicated to each output port with all the remaining slots being shared by all these ports. The central queue is a dual-ported memory illustratively containing 128 8-byte locations of which 8 of these slots are dedicated, one to each of eight output ports, with the remaining 120 of these slots being shared for use by all eight of these ports.

In addition, each of the input ports (receivers) appropriately classifies each message chunk based upon its current need at an associated output port (transmitter), i.e. whether that chunk is "critical" in the sense that this chunk must be routed as soon as possible to the output port or "non-critical" in the sense that this chunk can wait, and whether the shared portion of the central queue is currently full or not. If the current message chunk is critical, regardless of whether the shared portion of the central queue is full or not, that chunk is unconditionally stored in the dedicated slot for the corresponding output port. Once this output port becomes available, that chunk is read, during a single clock cycle, from this slot into this port. Inasmuch as one slot is always dedicated to each output port and only one chunk can be critical at any one time, the current message chunk can be accommodated regardless of the status of the shared portion of the queue. Alternatively, if this message chunk is non-critical and the shared portion of the central queue is not full, i.e. slots are then available to store incoming message chunks, a request is made by a receiver to an arbiter to determine whether, in view of similar requests then being made by all the other receivers, this chunk is to be stored in the shared portion of the central queue. Arbitration is conducted on a least recently used basis, i.e. the receiver that was not serviced for the longest time is the next one to be serviced. If the chunk is non-critical but the central queue is full, the associated receiver does not make such a request. Arbitration is also conducted, in response to requests made by the transmitters, to extract stored message chunks, if any exist, from the shared portion of the central queue that are destined for these transmitters. This arbitration is also conducted on a least recently used basis. Separate arbitration is used to control write access into and read access from the central queue. Though utilizing the same least recently used methodology, these arbitrations function separately and totally independently of one another to assure the requisite fairness among all the input and output ports then separately vying for write or read access, respectively, to the central queue.

When our inventive packet switch is incorporated into a packet network within a massively or even scalable parallel processing system, deadlock is substantially, and usually totally, eliminated with more consistent processor utilization occurring among all the processors and hence system throughput significantly increasing over that heretofore achievable using bi-directional packet networks known in the art.

BRIEF DESCRIPTION OF THE DRAWINGS

The teachings of the present invention can be readily understood by considering the following detailed description in conjunction with the accompanying drawings, in which:

FIG. 1 depicts a very high level simplified block diagram of scalable parallel processing system 5 that incorporates the teachings of our present invention;

FIG. 3 depicts the proper alignment of the drawing sheets for FIGS. 3A and 3B;

FIGS. 3A and 3B collectively depict a block diagram of illustrative switching circuit $25_1$ situated within system 5 shown in FIG. 1;

FIG. 9 depicts the proper alignment of the drawing sheets for FIGS. 9A and 9B;

FIGS. 9A and 9B collectively depict a high level block diagram of illustrative least recently used (LRU) arbiter 630 situated within transmitter $380_1$ shown in FIG. 6.

To facilitate understanding, identical reference numerals have been used, where possible, to designate identical elements that are common to various figures.

DETAILED DESCRIPTION

Figure 2A:
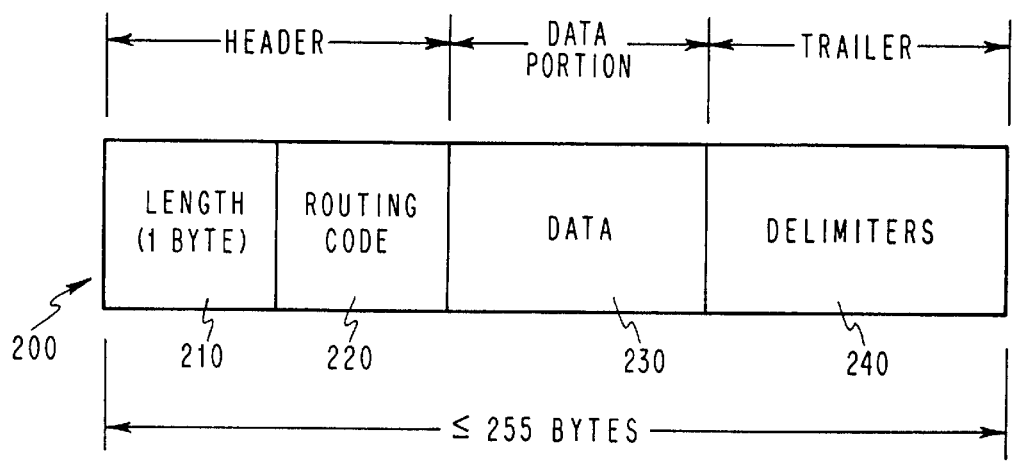
FIG. 2A depicts the organization of an inter-processor message utilized within system 5 shown in FIG. 1.

After considering the following description, those skilled in the art will clearly realize that the teachings of our invention can be readily utilized in any bi-directional packet network to substantially prevent deadlock from occurring. Currently, digital, and particularly packet based, bi-directional communication systems are finding increasing use in a wide range of applications stretching from, for example, public and private computer networks (e.g. local, wide or metropolitan area networks), to telephonic, and specialized communications applications such as the communication backbone of a massively parallel processing system. Inasmuch as the many bi-directional packet networks known in the art—regardless of their end use, and particularly bi-directional packet switches used therein, may often be susceptible to deadlock, our invention will find ready application in any of these switches to dramatically improve its traffic handling capacity and hence generally improve the performance of the system in which that switch is used. Nevertheless, to simplify the following discussion, we will specifically describe our invention in the context of use within a bi-directional packet switch that facilitates inter-processor communication in a scalable parallel processing system. Such a system can be readily scaled upward to a size that is synonymous with what is commonly referred to as a massively parallel processing system.

FIG. 1 depicts a very high level simplified block diagram of scalable parallel processing system 5 that incorporates the teachings of our present invention. This system is the 9076 SP1 system which is commercially available from International Business Machines (IBM) Corporation of Armonk, N.Y. which is also the present assignee hereof.

To the extent relevant, system 5 is configured as containing sixty-four separate processing elements 15. All of these processing elements operate in parallel with each of these elements performing a distinct portion of a given application. In order for each of these elements to perform its individual processing task, that element communicates with other processing elements through high speed bi-directional packet network 8, and specifically transfers application data through packet messages with other such elements, as the application requires. In that regard, each processing element undertakes its associated application processing upon receipt of the needed data from other processing elements and then communicates the results of that processing onward to another processing element(s), again by packet messages, for subsequent use therein, and so on.

As shown, system 5 is organized into four separate processing clusters, each of which contains sixteen separate processing elements 15 connected to corresponding nodes of a 16-by-16 bi-directional packet switch array. Specifically, processing clusters $10_1$, $10_2$, $10_3$ and $10_4$ contain switch arrays $17_1$, $17_2$, $17_3$ and $17_4$ which are connected to processors $15_1, \ldots, 15_{16}$; $15_{17}, \ldots, 15_{32}$; $15_{33}, \ldots, 15_{48}$; and $15_{49}, \ldots, 15_{64}$, respectively. All four packet switch arrays $17_1, 17_2, 17_3$ and $17_4$ are themselves interconnected through leads 35 to implement packet network 8. In that regard, arrays $17_1$ and $17_2$, $17_1$ and $17_3$, $17_1$ and $17_4$, $17_2$ and $17_4$, and $17_3$ and $17_4$ are interconnected through respective leads $35_3$, $35_1$, $35_2$, $35_{11}$ and $35_8$. In addition, file servers 40, which are conventional and well known in the art, are coupled, for packet communication, through leads 35, specifically leads $35_4$, $35_5$, $35_6$ and $35_7$ to the switch arrays within respective processing clusters $10_1$, $10_3$, $10_4$ and $10_2$ in order to write (download) a desired file(s) into any processing element for subsequent use thereat or to receive (upload) and subsequently store a file(s) from any processing element.

Inasmuch as all of the processing clusters are identical, then, for purposes of brevity, the following discussion will only address cluster $10_1$. This cluster contains sixteen separate processing elements, all of which are identical. Each of these processing elements is microprocessor based and specifically contains a reduced instruction set (RISC) microprocessor, such as preferably a RISC System /600 type microprocessor manufactured by the IBM Corporation, and associated memory, input/output (I/O) and supporting circuitry. Since the circuitry of each of these elements has essentially no bearing on the invention and is conventional and certainly readily apparent to anyone skilled in the art, each of these elements will not be discussed in any greater detail.

Each processing element, such as illustratively elements $15_1$ and $15_{16}$, can communicate on a bi-directional basis through bi-directional switch array $17_1$ and hence through packet network 8 with any other such element or the file servers. In doing so, each of these elements is connected through a pair of half-duplex links to a corresponding input port (also hereinafter referred to as a "receiver") of an 8-by-8 port bi-directional switching circuit located within this switch array. Switch array $17_1$ contains eight separate identical 8-by-8 switching circuits 25 (specifically circuits $25_1$, $25_2$, $25_3$, $25_4$, $25_5$, $25_6$, $25_7$ and $25_8$) inter-connected through leads 27. Each of these switching circuits, which will be described in considerable detail hereinbelow, routes packets from any of eight input ports to any of eight output ports. As such, the inter-connected switching circuits situated within switch array $17_1$ implement a bi-directional 16-by-16 packet switch. Our invention resides within each of the switching circuits. To simplify the drawing, each pair of half-duplex lines that connects to each processing element is shown as a single full-duplex line, such as lines $22_1$ and $22_{16}$ that respectively link processing elements $15_1$ and $15_{16}$ to switching circuits $25_1$ and $25_4$.

Operationally speaking, each processing element, such as element $15_1$, that desires to send a packet (i.e. an "originating" element) to another processing element (i.e. a "destination" element), such as element $15_{33}$, first assembles the packet, such as packet 200, to contain appropriate fields, as shown in FIG. 2A, principally: a header containing one-byte (eight-bit) length field 210 and a routing code field 220, followed by variable length data field 230 which, in turn, is itself followed by a trailer field containing various delimiters 240. The entire packet (also referred to herein as a "message") is limited to a maximum of 255 bytes in length. The length field specifies the length of the entire packet, in bytes. The routing code is formed of a number of successive groups of three-bit values, packed two groups per byte, with each group designating an output port address within a given 8-by-8 switching circuit. In practice, a number of such switching circuits are serially connected to implement successive routing stages. The number of such three-bit groups is governed by the number of successive routing stages, i.e. successive inter-connected individual switching circuits, used within the network. As each packet is routed through a given stage and as discussed in detail below, that stage examines the most significant three-bit group to discern the specific output port for that packet and then discards this group and shortens that packet accordingly. Accordingly, the next three-bit group becomes the most significant group for use by the next successive routing stage, and so forth. The data is a variable length field of application data provided by an application executing at the origination processing element and destined for use by a destination processing element.

Figure 2B:
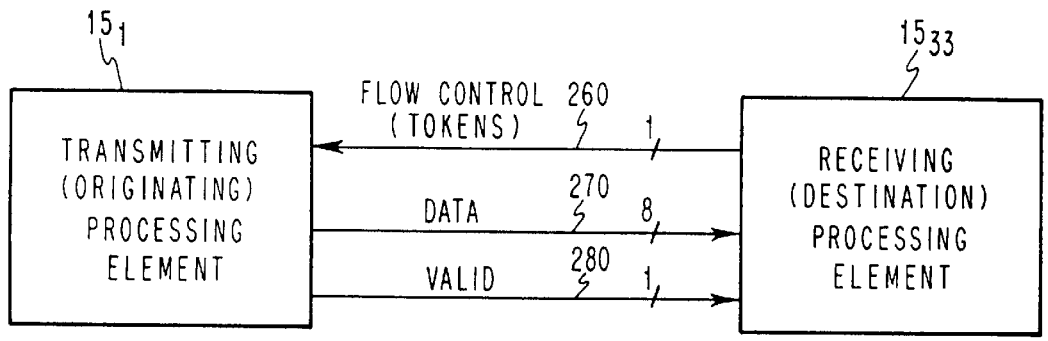
FIG. 2B depicts a simplified block diagram of a flow control and communication protocol used for inter-processor communication that occurs within system 5 shown in FIG. 1.

FIG. 2B depicts a simplified block diagram of a token based flow control and communication protocol used for inter-processor communication within system 5 shown in FIG. 1. Specifically as shown in FIG. 2B, ten leads carry communication between a transmitting, i.e. originating, processing element (or other switching circuit), here shown as illustratively element $15_1$, and a receiving, i.e. destination, processing element (or other switching circuit), here illustratively element $15_{33}$. Eight-bit leads 270 carry byte-serial data, i.e. one message byte at a time per clock cycle. Single-bit lead 280 carries a data valid signal which indicates, through a high level, the presence of a valid signal on leads 270.

Although system 5 shown in FIG. 1 is a clocked synchronous system (the clock signals are not explicitly shown), the propagation delay of the protocol signals, shown in FIG. 2B, from one end of the network to the other can exceed the clock period. Accordingly, a token based flow control methodology is used to provide an effective flow control mechanism. Hence, single-bit lead 260, shown in FIG. 2B, carries a token signal which can be simplistically viewed as a single bit signal traveling across this lead. This signal, which is directed in the reverse direction as the data flow over leads 270, when received, represents a right of its recipient, here element $15_1$, to send another byte of data. In particular, and as discussed below, transmitting element $15_1$ contains an internal token counter which, at system initialization, is preset to contain a specific number of tokens, typically "31". Whenever that element sends a message byte across leads 270, the token count at this element is decremented by one. Whenever receiving element $15_{33}$ is willing to accept another message byte from this transmitting element, the former element sends a token back across lead 260 to increment the token count at the latter element. The transmitting element can only send message bytes if its internal token counter contains a non-zero count. Once the count reaches zero, the transmitter is inhibited from sending any further bytes until its token count is appropriately changed. For error detection purposes, the token signal, in practice, is encoded as two-bit serial signal: "01" defines zero tokens and "10" defines two tokens. As such, every other clock cycle, receiving element $15_{33}$ can decide to send either zero or two tokens to transmitting element $15_1$. Essentially identical token based flow control operations occur within receiving element $15_{33}$ to control the number of bytes that element can receive. Here, each token impinging upon the receiving element and stored within its internal token counter represents the right of that particular element to receive another message byte.

With the above in mind, a block diagram of our inventive switching circuit, illustratively circuit $25_1$ and which is situated within system 5 shown in FIG. 1, is collectively depicted in FIGS. 3A and 3B; the correct alignment of the drawing sheets for these latter two figures is shown in FIG. 3. To simplify the drawings and to enhance reader understanding, all input ports (receivers) are shown on the left side of FIGS. 3A and 3B and all output ports (transmitters) are shown on the right side. In actuality to implement bi-directional communication for each processing element connected to the switching circuit, that element is connected to both an input port and an output port of the same switching circuit. Furthermore, although our inventive switching circuit is illustratively embodied within an 8-by-8 packet router, our inventive teachings can be readily used within nearly any size packet switch (router) to avoid deadlocks.

As shown, switching circuit $25_1$ contains eight identical input port circuits (receivers) $310_1, 310_2, 310_3, \ldots, 310_8$, all of which collectively form receivers 310; eight identical output port circuits (transmitters) $380_1, 380_2, 380_3, \ldots, 380_8$, all of which collectively form transmitters 380; central queue 350; and cross-point switching matrix 360. Each of receivers 310, such as receiver $310_1$, is connected, through the ten-lead token based protocol arrangement described above in connection with FIG. 2B, via associated leads, such as leads $22_1$, to a corresponding processing element, such as processing element $15_1$. Of these ten leads, for simplicity, the eight-bit data leads and the single-bit valid lead are collectively shown as a common input (IN) lead, such as lead 311. The token (flow control—FC) lead is shown as separate single-bit lead 313. Each of these receivers, to the extent relevant, performs four major functions as discussed in detail below: administering the channel flow-control protocol, buffering incoming messages using an internal queue, deserializing incoming messages into 8-byte message portions (hereinafter referred to as "chunks") and decoding message routing information. Each processor is responsible for fully assembling a packet, including embedding appropriate header and trailer information, prior to supplying that packet to the companion receiver. Based upon contention, message chunks are then directed from the associated receivers along either of two paths. If the destination output port for that chunk is then available and hence not experiencing any contention, that chunk is immediately routed through cross-point matrix 360 to effectuate a very low latency packet transfer. Alternatively, if there is traffic in the central queue contending for routing to the same output port, then that chunk is written into a corresponding 64-bit slot within the central queue. The packet is thereafter transferred out of the central queue to its destination output port circuit when that circuit once again becomes available. Central queue 350 is dual-ported and contains 128 64-bit locations, each of which can store a message chunk. Since both the central queue and the cross-point switching matrix can route packets to the same destination output port circuit, cross-point switching matrix 360 forms a so-called "by-pass" path around the central queue.

To transfer a message chunk from any receiver into the central queue, each receiver has a separate eight-byte output (labeled $O_Q$) which is connected, via 64-bit bus 315, to a 64-bit data input (labeled IN) on central queue 350. Similarly, to transfer a chunk from the central queue to any transmitter, the central queue has a 64-bit output (labeled OUT) which is connected, via bus 370, to a 64-bit input of each of the transmitters. Chunks are supplied to and written from the central queue on a time-multiplexed basis, with each receiver supplying its associated chunk during a corresponding clock cycle and each transmitter obtaining a message chunk destined therefor during its associated corresponding clock cycle. As long as chunks are situated within corresponding receivers for subsequent routing or are situated in the central queue and awaiting delivery to a destination transmitter, one of these receivers and one of these transmitters is served each clock cycle, with the receivers being independently served apart from the transmitters.

In order to determine whether an output port circuit is experiencing contention and thus whether a message chunk can then be routed through cross-point switching matrix 360, each receiver issues a request signal to the destination transmitter. The destination transmitter, as will be discussed in detail below, contains an arbiter which arbitrates the status of eight request signals, one from each receiver, and determines which of the receivers, if any, is then to be granted permission to send its message chunk through the cross-point switch to that output port. Specifically, each of the receivers issues eight request (REQ) signals, and particularly one to each transmitter. In this regard, receiver $310_1$ issues eight separate request signals $REQ_{(1,1), \ldots, (1,8)}$ which, via eight-bit leads $314_1$ and request/grant bus 320, feed the first receiver request input of each of the eight transmitters, i.e. $380_1, 380_2, 380_3, \ldots, 380_8$. If a message chunk situated at this receiver is destined for first transmitter $380_1$, then this particular receiver asserts the request signal for this particular transmitter, and so forth for messages destined for each of the other transmitters. All eight request signals for this particular transmitter originating from the first request signal issued by each of the eight receivers are collectively routed to this transmitter, via leads $374_1$. To facilitate understanding, the request and grant signals, e.g. $REQ_{(1,8)}$ carry sub-scripts wherein the first sub-script denotes the index of the specific originating receiver, here receiver $310_1$, and the second sub-script denotes the index of the specific destination transmitter, here illustratively transmitter $380_8$. Similarly, each of the other receivers issues eight separate request signals ($REQ_{(2,1)}, \ldots, _{(2,8)}; REQ_{(3,1)}, \ldots, _{(3,8)}; \ldots, REQ_{(8,1)}, \ldots, _{REQ(8,8)}$) which are connected, through eight-bit leads $314_2, 314_3, \ldots, 314_8$, bus 320 and leads $374_2, 374_3, \ldots, 374_8$, to the same corresponding request inputs of all eight destination transmitters, respectively. Based upon the status of the eight request signals applied to the arbiter within each transmitter and the arbitration scheme used therein (specifically least recently used, as described below), the arbiter at that transmitter grants permission to one of the receivers, by asserting its associated grant signal thereto, to then transmit a message chunk through the cross-point switching matrix to this transmitter. To do so, each transmitter supplies eight grant signals, with one of these grant signals being connected to the same corresponding grant signal input on each receiver. In this regard, transmitter $380_1$ supplies eight grant signals ($GRT_{(1,1)}, \ldots, _{(8,1)}$), via leads $376_1$ and bus 320. Each of these particular signals is routed to the first grant signal input of each receiver. Similarly, the grant signals ($GRT_{(1,2)}, \ldots, _{(8,2)}; GRT_{(1,3)}, \ldots, _{(8,3)}; \ldots GRT_{(1,8)}, \ldots, _{(8,8)}$) issued by each of the other transmitters, are connected by corresponding leads $376_2, 376_3, \ldots, 376_8$, bus 320 and leads $316_2, 316_3, \ldots, 316_8$ to corresponding grant signal inputs of each of the receivers. In response to the particular grant signal being asserted at a given receiver, that receiver then routes its current message chunk, in eight-byte serial fashion, onward, via output leads ($O_X$) into cross-point switching matrix 360. Receivers $310_1, 310_2, 310_3, \ldots, 310_8$ are connected, via 8-bit leads $312_1, 312_2, 312_3, \ldots, 312_8$, to corresponding byte-serial input of the cross-point switching matrix. Separate byte-serial inputs of this switching matrix are connected through leads $372_1, 372_2, 372_3, \ldots, 372_8$ to corresponding byte-serial inputs of transmitters $380_1, 380_2, 380_3, \ldots, 380_8$. Inasmuch as switching matrix 360 is of conventional design, it will not be discussed in any greater detail.

Those message chunks that are experiencing contention are routed into available 64-bit slots within central queue 350, pending subsequent availability of the destination transmitters. This queue implements a buffered time-multiplexed 8-way router. Within the central queue, the stored messages are organized into eight linked lists with each list being associated with a different transmitter.

Each of transmitters 380, specifically transmitters $380_1, 380_2, 380_3, \ldots, 380_8$, as described in detail below, performs several functions. Specifically, each transmitter accepts message chunks, in time-divisional fashion and in 64-bit parallel form, from the central queue, serializes these chunks, buffers the resulting serial information in an output queue and then transmits the resulting buffered information, as a byte-serial bit stream, to an output channel in accordance with the ten-bit token based flow control protocol. Each transmitter also accepts message portions in byte-serial fashion that have been routed through cross-point switching matrix 360 and properly multiplexes these byte-serial portions into the byte-serial bit stream for the associated output channel. Through the ten-bit protocol, each transmitter produces byte-wise serial data on eight data leads and a valid data signal on a separate one-bit lead. For simplicity, all these nine leads are shown as a single common lead (OUT). The associated flow control lead is shown as a separate lead (FC). All these output leads collectively form leads 390 with those leads supplied by illustratively transmitter $380_1$ being leads $390_1$.

Control circuitry 340, which is conventional logic and finite state machine circuitry, generates various control and clock signals to properly control the operation of switching circuit $25_1$. These control signals are typified by appropriate clock and timing signals applied, via leads 344, to central queue 350 and, via leads 346, to other components of this circuit. An external source of clock pulses is applied over lead 342 as an input to control circuitry 340. Inasmuch as all these clock and control signals would be readily apparent to anyone skilled in the art and to simplify the drawing (not only of FIGS. 3A and 3B but also of other figures), none of these particular signals is shown or described in any greater detail.

As taught in the art, specifically M. Denneau et al, "The Switching Network of the TF-1 Parallel Supercomputer", *Supercomputing*, Winter 1988, pages 7–10, central queue 350 contains 128 8-byte locations all of which would be shared and dynamically allocated according to demand then existing. Furthermore, the receivers and transmitters are served on a first-come first-served basis.

We have determined that if such a switching circuit with a completely shared central queue were to be used to implement a bi-directional packet network in a massively, or even scalable, parallel processing system, then that network would be susceptible to experiencing deadlocks. A deadlock, when it occurs, would completely throttle traffic from moving through the network and effectively prevent application processing from proceeding, thereby significantly reducing the throughput of the processing system.

Advantageously, we have invented a switching circuit, predicated on that described above, that advantageously avoids deadlock when used in a bi-directional packet network.

In accordance with our inventive teachings, the central queue, rather than having all its 8-byte slots shared among all the output ports, is apportioned to contain one (or more) slots that is dedicated (reserved) to each output port with all the remaining slots being shared among all these ports. In a preferred embodiment, only one slot is dedicated to each output port with the remaining 120 slots being shared by all these ports. In addition, each of the receivers appropriately classifies each message chunk that is then to be routed to a destination transmitter based upon its current need at that transmitter, i.e. whether that chunk is "critical" in the sense that this chunk must be routed as soon as possible to the transmitter or "non-critical" in the sense that this chunk can wait, and whether the shared portion of the central queue is currently full or not. If the current message chunk is critical, regardless of whether the shared portion is full or not, that chunk is unconditionally stored in the dedicated slot, of the central queue, for the corresponding transmitter. Once this transmitter becomes available, that chunk is read, during a single clock cycle, from this slot into this transmitter. Inasmuch as one slot is always dedicated to each output port and only one chunk can be critical at any one time, the current message chunk can be accommodated regardless of the status of the shared portion of the queue. Alternatively, if this message chunk is non-critical and the shared portion of the central queue is not full, i.e. a shared slot(s) is then available to store that message chunk, a request is made by the receiver to an arbiter to determine whether, in view of similar requests then being made by all the other receivers, this chunk is to be stored in the shared portion of the central queue. Arbitration is conducted on a least recently used basis, i.e. the receiver that was not serviced for the longest time becomes the next one to be serviced. If the chunk is non-critical but the central queue is full, the associated receiver does not make such a request. Arbitration is also conducted, in response to requests made by the transmitters, to extract stored message chunks, if any exist, from the shared portion of the central queue that are destined for these transmitters. This arbitration is also conducted on a least recently used basis. Advantageously, separate arbitration is used to control access into and from the central queue. Though utilizing the same least recently used methodology, these arbitrations function separately and totally independently of one another to assure the requisite fairness among all the input and output ports then separately vying for write or read access, respectively, to the central queue.

Figure 4:
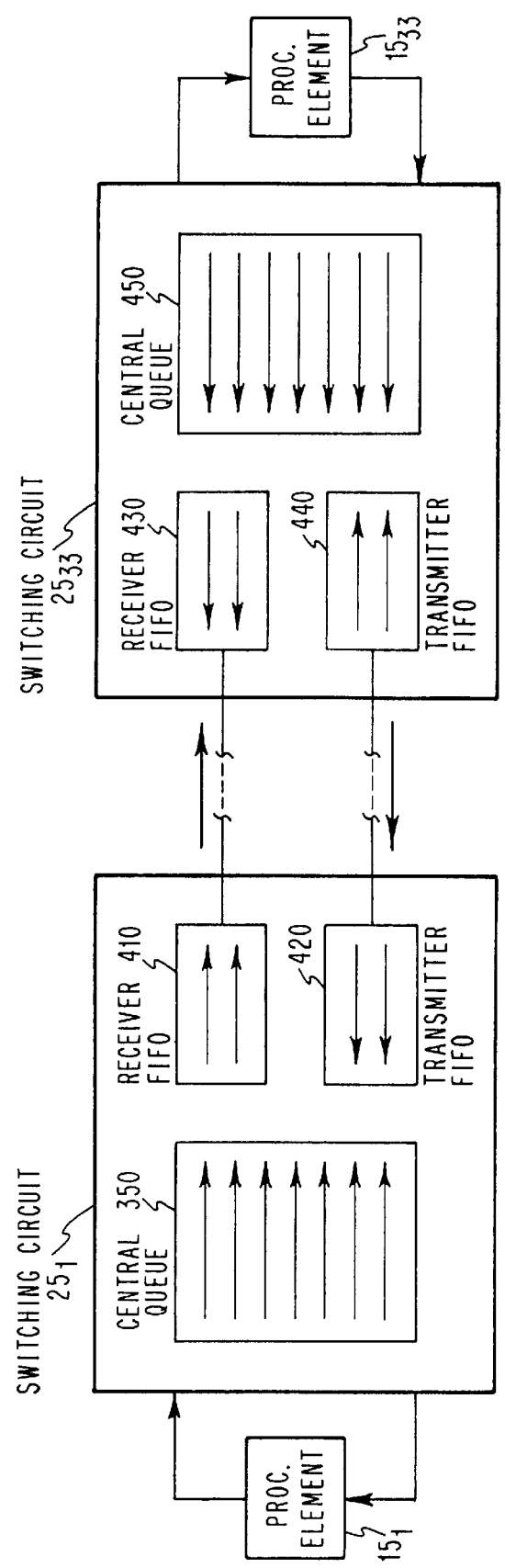
FIG. 4 diagrammatically depicts a deadlock condition.

To fully understand the impact of deadlock, we will turn the discussion to FIG. 4 which illustrates deadlock condition and then return to completing the description of switching circuit $25_1$ shown in FIGS. 3A and 3B and particularly our inventive portion thereof.

FIG. 4 simplistically depicts two illustrative switching circuits $25_1$ and $25_{33}$, within system 5, that are situated on opposite ends of an inter-processor communication channel. Processing elements $15_1$ and $15_{33}$ are respectively connected to circuits $25_1$ and $25_{33}$ in order to bi-directionally transfer message packets therebetween. Deadlock arises if, during the course of system processing, all the message storage locations become full in such a manner as to block any further message transfers. This can occur, as shown in FIG. 4, when each one of two corresponding memory portions of both switching circuits (central queues 350 and 450, and internal receiver FIFO (first-in first-out) queues 410 and 430, and transmitter FIFO queues 420 and 440) is totally full with traffic that is heading in an opposing direction to the traffic then stored in the other corresponding memory portion, i.e. central queue 350 is completely full with message traffic headed to the right while central queue 450 is completely full with message traffic headed to the left. With this condition, there is simply no space within any receiver FIFO queue to accommodate another incoming message chunk nor is there any space available in any central queue into which a message chunk can be transferred from this receiver FIFO queue. As such, and also in the absence of space within a destination output port into which a message chunk could be transferred from a central queue, no chunks are transmitted. This condition will persist indefinitely until a storage location (slot) in any one FIFO or a central queue is freed. In the absence of freeing such a slot, inter-processor data flow halts which, in term, halts any further application processing. Given the heavy traffic loads that occur in a bi-directional packet network used within a scalable, let alone a massively, parallel processing system, deadlocks can occur rather frequently—unless appropriate measures are taken to eliminate their occurrence.

To substantially, and usually totally, prevent deadlocks from occurring in a bi-directional packet network used in a scalable processing system, illustratively system 5 shown in FIG. 1, we have modified switching circuit $25_1$, in accordance with our inventive teachings, in various respects. First, as discussed above, central queue 350 contains two types of slots (explicitly shown in FIGS. 7 and 8 and discussed hereinbelow): eight dedicated slots in which each output port has a dedicated slot to which a message chunk can be stored for transfer to that port; with the remaining 120 slots being shared among all output ports and dynamically allocated for use by any of the output ports based upon current traffic needs. Second, to route a message chunk to the appropriate slot, i.e. either dedicated or shared, in the central queue, each of the receivers contains an appropriate classifier circuit (shown and described in detail below in connection with FIGS. 5 and 10) that, based upon the status of that chunk (critical/non-critical) and the status of the central queue (full/not full) either stores that chunk in the dedicated slot in the central queue for the output port to which the chunk is destined or issues a request to store that chunk in a shared slot in this queue. The status of the central queue (QS) is provided by signals appearing on leads 355, shown in FIGS. 3A and 3B, and connected to each of the receivers. In addition, identical separate least recently used arbiters 368 and 385 are used to separately arbitrate access into (write access) and from (read access) the central queue. This advantageously permits write and read access involving the central queue to proceed independently of each other. Inasmuch as this access for each direction now occurs on a least recently used (LRU) basis rather than on a first-come first-served time-multiplexed basis as had occurred in the art, each port has a far greater chance of being served at any one clock cycle than has previously occurred. This, in turn, significantly decreases the likelihood that any port will be starved of its traffic owing to bottlenecks that might otherwise arise to a high level of activity at another port. Inasmuch as our inventive switching circuit treats all ports and with priority given to message traffic arising at or intended for the most infrequently used ports, application processing across all the processing elements tends to equalize throughout the entire system, thereby advantageously increasing system throughput.

In order to arbitrate write access into the central queue, each one of receivers 310 (specifically receivers $310_1, 310_2, 310_3, \ldots, 310_8$) issues a separate central queue write (input) request signal over a corresponding request lead within leads 386 (which respectively contains paired grant and request leads $386_1, 386_2, 386_3, \ldots, 386_8$) to arbiter 385. In response to the requests then occurring, this arbiter generates a grant signal (GRT_QI), typically by asserting an appropriate logic level on the grant lead within the appropriate paired request and grant leads, back to the receiver then accorded permission to write a memory chunk into the central queue. In response, the appropriate receiver will then write this message chunk onto 64-byte bus 315. In addition, arbiter 385 also generates an enable signal, on leads 389, to signal the central queue to write the message chunk then appearing on bus 315 into this queue and to specify the destination transmitter for this chunk. In response to the value of the enable signal, circuitry within the central queue (not explicitly shown in FIGS. 3A and 3B) selects the particular slot to use to store this particular incoming message chunk and the particular list to which the current message containing this chunk is to be appended. A critical chunk is written into the dedicated slot for the corresponding destination transmitter since that slot will always be available at the time. A non-critical chunk is typically written into the first available shared slot.

As will be discussed in detail hereinbelow, message chunks are stored within the central queue in the form of eight linked lists: one list for each different transmitter. Each list contains all the successive message chunks that have been stored for the corresponding transmitter as well as, whenever the need arises, separate successive messages destined therefor. As each message chunk is stored within the central queue, that chunk is simply added to the tail of the corresponding list with that list being extended accordingly. Conventional circuitry within the central queue maintains an internal table (as discussed below in connection with FIG. 7) with entries that maintain links between the chunks then stored within the central queue in order to define the eight lists. In response to the read and write enable signals applied to the central queue, this circuitry manipulates the appropriate list and updates the table: either by accessing the chunk stored at the head of the list in the case of a read operation or adding an incoming message chunk to the tail of this list in the case of a write operation, and altering the list structure accordingly.

Similarly, to control read access to the central queue, each one of transmitters 380 (specifically transmitters $380_1$, $380_2$, $380_3$, ..., $380_8$) issues a separate central queue read (output) request signal over a corresponding request lead within leads 383 (which respectively contains paired grant and request leads $383_1$, $383_2$, $383_3$, ..., $383_8$) to arbiter 368. In response to the requests then occurring, this arbiter generates a grant signal (GRT_QO) on leads 365 back to the read enable inputs of the central queue. The status of the grant signals specifies the specific transmitter then accorded permission to obtain a stored chunk from the central queue. In response to these grant signals appearing at the read enable inputs, the central queue reads the message chunk situated at the head of the list for that specific transmitted onto 8-byte bus 370, and then deletes this chunk from the list. In addition, to instruct the specific transmitter to read this message chunk from bus 370, the grant signal is also applied, typically by asserting an appropriate logic level on the grant lead within the appropriate paired request and grant leads 383, to this transmitter.

Having described the overall architecture of our inventive switching circuit, we will now describe various components within this circuit that are relevant to our invention. The specific implementation of each of these components should be readily apparent to anyone skilled in the art from the ensuing high level description. Furthermore, these components utilize internal control and clocking circuitry. Inasmuch as both the composition of this control and clocking circuitry and its connections to the remaining circuitry within each of these components would also be readily apparent to those skilled in the art, then to simplify the drawings and the accompanying discussion, only the interconnections of the control circuitry and its functioning that are pertinent to the present invention will be specifically shown and addressed herein.

Figure 5:
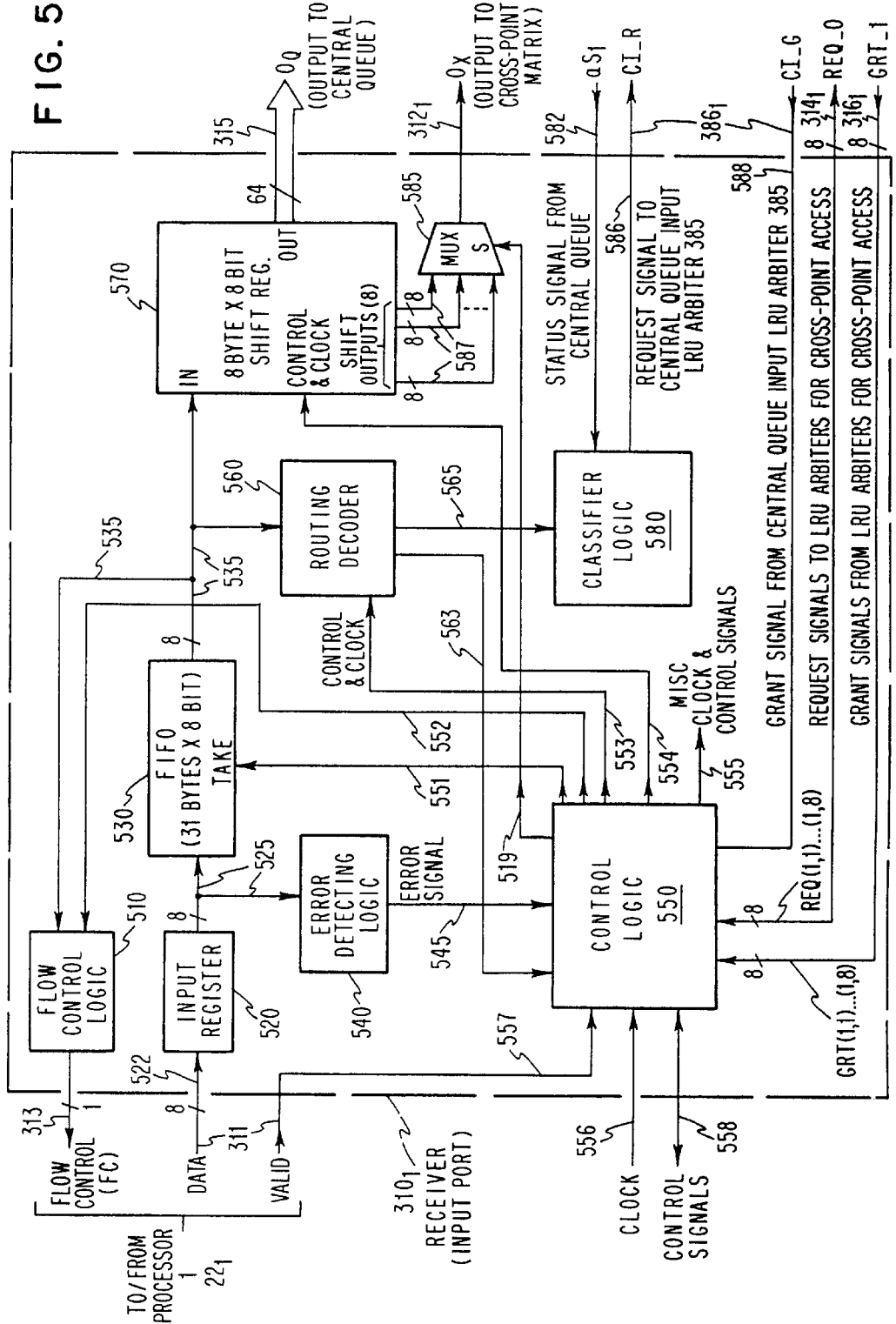
FIG. 5 depicts a block diagram of illustrative receiver (input port) $310_1$ situated within switching circuit $25_1$ shown in FIGS. 3A and 3B.

FIG. 5 depicts a block diagram of illustrative receiver (input port) $310_1$ situated within switching circuit $25_1$ (shown in FIGS. 3A and 3B. Receiver $310_1$ performs the following major functions: administering the ten-lead channel flow-control protocol, buffering incoming messages using an internal queue, deserializing incoming messages into 8-byte chunks and decoding message routing information. In addition, the receiver also routes, in the absence of contention for an output port, chunks to the cross-point switching matrix for low latency transfer therethrough to that output port. If output contention does exist for chunks destined for any output port, the receiver also classifies each of these chunks as critical or non-critical and writes each of these chunks, based upon its classification, into the central queue (for storage in either a corresponding dedicated or shared slot therein).

Specifically, as shown, receiver $310_1$ contains flow control logic 510, input register 520, FIFO queue 530, error detecting logic 540, control logic 550, routing decoder 560, 8-byte-by-8-bit shift register 570, classifier logic 580 and multiplexer 585. Input leads $22_1$, in implementing the ten-lead flow control protocol described above, separately carry eight data leads and a valid signal on nine leads 311, with the data itself being carried on leads 522 and the valid signal appearing on lead 557; and serial flow control (FC) bits carried on single lead 313. As noted above, the flow control bits implement tokens, each of which grants the recipient of the token the right, in the case of a receiver, to send a byte to a transmitter or, in the case of a transmitter, to receive a byte from a receiver.

Under control of control logic 550, input register 520 provides a single byte (8-bits) of storage to latch each incoming data byte and synchronize that byte to the system clock. This chunk is latched into the register only if that chunk is valid; the latter indicated by a proper level being asserted on valid lead 557 and detected by control logic 550. The chunk is then clocked out of register 520 onto 8-bit leads 525 and applied to an input of both FIFO queue 530 and to error detecting logic 540. Queue 530 is a 31-byte-by-8-bit FIFO queue (implemented from typically a 32-byte section of RAM memory) which is used to provide sequential storage (input buffering) of 31 successive incoming message chunks. Error detecting logic 540 conventionally examines every 62 successive bytes in each incoming frame of 64 successive time-divisionally multiplexed bytes appearing on lead 525 for a bit error(s) by generating an appropriate error correcting code, typically by applying these bytes as input to a pre-defined cyclic redundancy code polynomial. The last two bytes in any such frame contain a value of this polynomial for the prior 62 bytes, but generated by upstream circuitry. Logic 540 compares the value it generates to that in the last two bytes in the frame to discern any discrepancy therebetween. Such a discrepancy indicates a bit error. If such an error is detected, then logic 540 generates an appropriate error signal and supplies that signal, via lead 545, to control logic 550. As a result of this signal, this control logic generates a message to high level control circuitry, specifically control circuitry 340 shown in FIGS. 3A and 3B to appropriately inform the latter of this error and solicit suitable corrective action therefrom.

Each chunk written in FIFO queue 530, as shown in FIG. 5, is subsequently pulled in succession from this queue in response to an appropriate "TAKE" signal appearing on lead 551 and generated by control logic 550. The byte-serial output of FIFO queue 530 is routed, via leads 535, to an input of flow control logic 510 and to an input of routing decoder 560 and shift register 570. As each chunk exits from FIFO queue 530, this frees a space within this queue for another chunk. As such, flow control logic 510 issues an appropriate token to grant the originating processing element the right to send another message byte to receiver $310_1$. As noted above and in practice, the tokens on flow control lead 313 are encoded into a two-bit form to signify the grant of either two tokens or no tokens. As discussed above, both the receiver, specifically flow control logic 510, and the transmitter, specifically flow control logic 690 therein (discussed below in conjunction with FIG. 6), maintain a count of its corresponding tokens and can only respectively send or receive an incoming message byte if this count reveals that it has an unused token to do so. Flow control logic 510, shown in FIG. 5, is suitably controlled in response to clock and other control signals appearing on leads 552 and issued by control logic 550. Upon system initialization, the token count in the flow control logic in each of the receivers and transmitters is set to the value "31".

As discussed above, each message contains a routing field. At any one switching stage (i.e. within any one switching circuit), the most significant three bits of that field specify the route through that stage and are then discarded with the message being appropriately shortened. Specifically, as chunks of a message appear in byte-serial form at the output of FIFO queue 530 and on leads 535, routing decoder 560 extracts the three most significant bits of the routing field for this message and applies these bits, as the current route, both to control logic 550 and to classifier logic 580. After the three-bit routing field is extracted, the routing decoder also changes the value of the length field to appropriately shorten the message. With the value of these three routing bits, the control logic issues an appropriate request signal, on leads $314_1$, to the LRU arbiter at the destination transmitter within the switching circuit in order to determine whether the current chunk can be routed through cross-point matrix 360 (see FIGS. 3A and 3B), i.e. whether there is no contention for the destination transmitter. If no contention currently exists for this transmitter or if this contention is resolved by the LRU arbiter in favor of this transmitter, this arbiter issues a grant signal for this transmitter, which is carried, via leads 3161, to control logic 550 shown in FIG. 5. In response to this grant signal and, in a manner to be discussed shortly, this chunk is routed in byte-serial fashion, under the control of logic 550, through shift register 570 and multiplexer 585, into the cross-point matrix and from there to the destination transmitter. Routing decoder 560 is controlled through appropriate clock and control signals appearing on leads 553 and generated by control logic 550.

Alternatively, if contention exists and is not resolved in favor of receiver $310_1$, then the current chunk can not be routed through the cross-point switching matrix and must instead be temporarily stored, if possible, within the central queue. To accomplish the latter, the current route determined by routing decoder 560 is supplied to classifier logic 580. This logic determines whether this chunk is one that is critical in the sense that this chunk must be the next chunk received by its destination transmitter. In essence, a critical chunk is one that is to be routed as quickly as possible. A chunk is viewed to be critical if it is the first chunk of a message destined for a transmitter and no contention exists for that transmitter, or if that chunk is a continuation chunk. In the latter case, since no message interleaving is allowed, the destination transmitter and processing element thereat are unable to perform any other tasks until the entire message, i.e. all the chunks therein, has been received. Therefore, to conserve processing time, once an initial chunk of a message has been transferred, the remainder of the message is transferred as quickly as possible to its destination transmitter and ahead of other messages waiting to be transferred thereto. In the case of a critical chunk, classifier logic 580 issues a (unconditional) request, onto lead 586 within leads $386_1$, for input access to the central queue. This request is then arbitrated by central queue input LRU arbiter 385 shown in FIGS. 3A and 3B. Since, at any one time, only one chunk can be critical for any one transmitter, arbiter 385 issues a grant signal, onto leads $386_1$ and particularly lead 588 shown in FIG. 5, for this chunk. This grant signal is applied to control logic 550 which, in turn, controls shift register 570 to output this chunk, in parallel via 64-bit leads 315, to the central queue.

If, on the other hand, routing decoder 560 determines that the current chunk is non-critical, then this chunk is to be stored within the shared portion of the central queue only if a slot is available therein. If space is available within the central queue, as indicated by the status signals then applied over lead 582, classifier logic 580 will issue a request (though conditioned) for service onto lead 586. This request is then arbitrated on a least recently used basis by LRU arbiter 385 (see FIGS. 3A and 3B) along with other such requests then occurring for input access into the central queue. If this request is granted, this arbiter issues a grant signal onto lead 588 shown in FIG. 5. Alternatively, if a shared slot is not available, classifier logic 580 will not issue a request for input access to the central queue.

To simplify understanding, the individual grant and request signals are shown throughout the figures and discussed herein as though they are each a single-bit signal carried on a separate lead. However, in a practical embodiment and to reduce cross-chip wiring, the request and grant signals are each actually 4-bit signals: three bits are used to address a corresponding transmitter from which a grant is sought and one bit respectively carries an actual "request" or "grant" bit. As such, a 4-bit bus is sent from each receiver to every one of the transmitters with each transmitter checking to determine whether service is being requested from it. Hence, there are eight of these four-bit busses, one emanating from each receiver and all 32 of these busses feeding each one of the transmitters.

Furthermore, receiver $310_1$ monitors all eight grant signals applied to it over leads $314_1$ to determine whether this receiver has been granted access to the cross-point switching matrix. As such, all eight of these signals are simply "Or'ed" together within control logic 550 to generate a single resultant OR'ed grant signal to which this receiver responds by routing the chunk in byte-serial fashion onto leads $312_1$ for routing through the cross-point switching matrix.

As noted above, chunks are written, through shift register 570 and during corresponding time periods, on either a parallel fashion into the central queue or, in conjunction with shift register 570 and multiplexer 585, in byte-serial fashion into the cross-point switch. Register 570 and multiplexer 585 operate, in response to appropriate control and clock signals generated by control logic 550 and applied to leads 554 and 589. Shift register 570, is organized as 8-bytes-by-8-bits and de-serializes the chunks applied to it into a parallel 64-bit form. In this regard, each byte in a chunk is shifted into this shift register as soon as it appears at the output of FIFO queue 530. During steady state operation, a byte is shifted into the shift register during every clock cycle and is sent broadside (as part of a 64-bit parallel transfer) into the central queue every eight clock cycles. For transfers into the cross-point switching matrix, bytes are taken out of shift register 570 through multiplexer 585. As shown, this multiplexer is connected, through leads 587, to the individual bit outputs of each byte location within the shift register. counter (not shown) situated within control logic 550 tracks a position of the next byte of the current packet to be transferred through the cross-point switching matrix. The contents of this counter are fed, via leads 589, to the select (S) input of multiplexer 585. This count is incremented by one each time, by appropriate logic within logic 550, when a new byte is shifted into shift register 570 and is decremented by one each time a byte is transferred from the shift register, through multiplexer 585, to the cross-point switching matrix. However, if a byte is transferred and a new byte is shifted into the shift register, then the count is not changed.

Lastly, control logic 550 generates a variety of other control and clock signals, none of which are particularly relevant here, and applies these signals to leads 555 to control various other aspects of receiver $310_1$.

Figure 6:
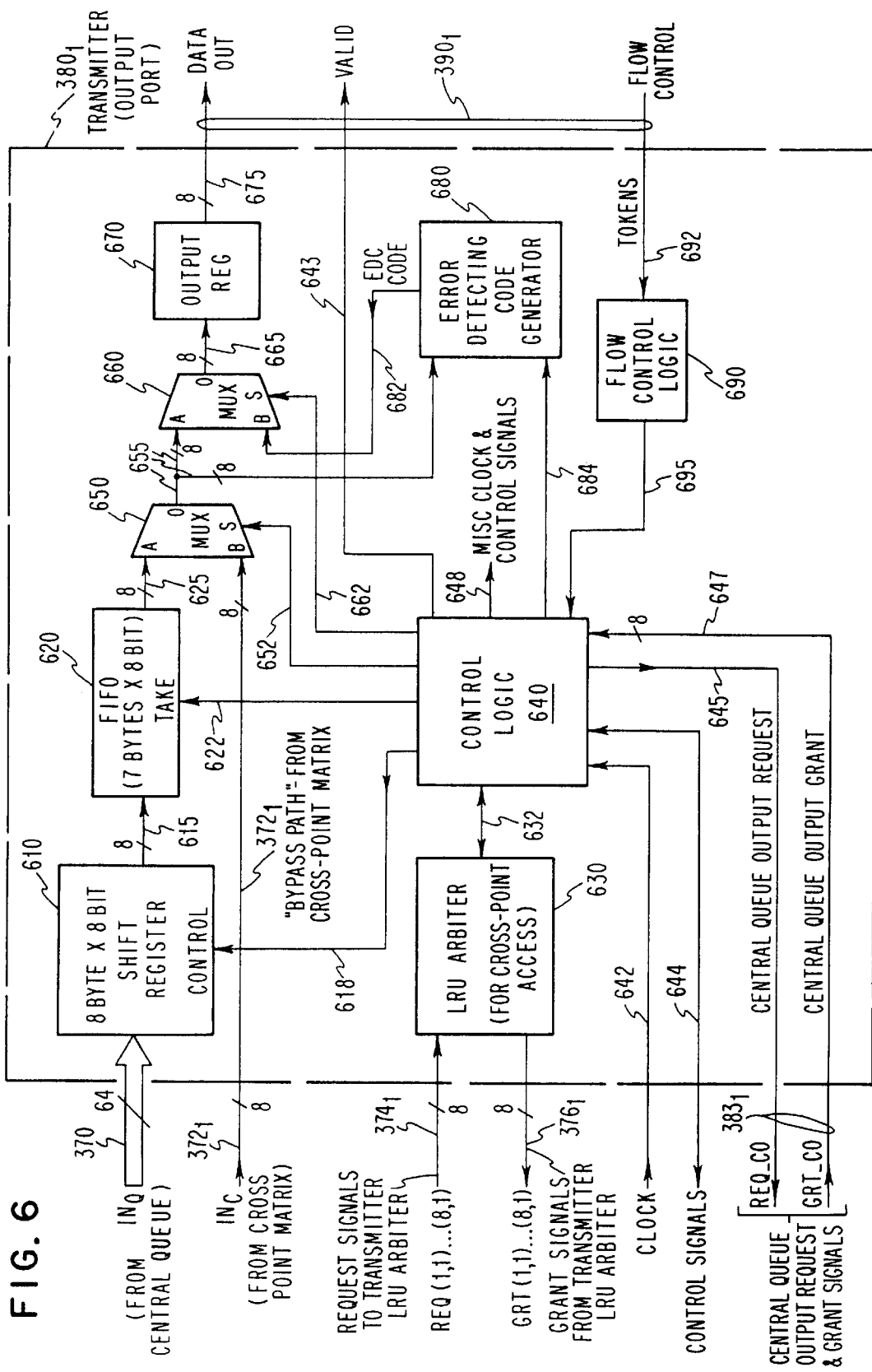
FIG. 6 depicts a block diagram of illustrative transmitter (output port) $380_1$ also situated within switching circuit $25_1$ shown in FIGS. 3A and 3B.

FIG. 6 depicts a block diagram of illustrative transmitter (output port) $380_1$ also situated within switching circuit $25_1$ shown in FIGS. 3A and 3B. As discussed above, transmitter $380_1$ performs various functions. Specifically, this transmitter accepts chunks for a given message, in time-divisional multiplexed fashion, from the central queue, serializes these chunks, buffers the resulting serial information in an output queue and then transmits the resulting buffered information, as a byte-serial data stream, to an output channel in accordance with the ten-bit token based flow control protocol. Each transmitter also accepts message portions in byte-serial fashion that have been routed through the cross-point switching matrix and properly multiplexes these byte-serial portions into the byte-serial data stream for the associated output channel. Through the ten-bit protocol, each transmitter produces byte-wise serial data on eight data leads and a 0valid data signal on a separate one-bit lead.

Specifically, as shown, receiver $380_1$ contains 8-byte-by-8-bit shift register 610, FIFO queue 620, LRU arbiter 630, control logic 640, multiplexers 650 and 660, output register 670, error detecting code generator 680 and flow control logic 690. Output leads $390_1$, in implementing the ten-lead flow control protocol described above, separately carry eight data leads (OUT) and a valid signal on leads 675 and lead 643, respectively; and serial flow control (FC) bits carried on single lead 692. As noted above, the flow control bits implement tokens, each of which grants the recipient of the token the right, in the case of a transmitter, to utilize an incoming byte being presented as input to the transmitter. The output provided on leads $390_1$ can be connected to a processing element or another switching circuit, the latter to implement multi-stage packet switching.

Under the control of control logic 640, shift register 610 accepts a chunk in 64-bit parallel form from the central queue, specifically via input ($IN_Q$) leads 370, and serializes the chunk into byte-serial form. Each chunk is clocked into the shift register as soon as it appears at the output of the central queue. After a chunk is latched into the shift register, that chunk appears over the next eight clock cycles at the output of the register in byte-serial form on leads 615. As each byte appears on leads 615, that byte is applied as input to FIFO queue 620. This queue is organized as 7-bytes-by-8-bit and is typically implemented from an eight-byte section of RAM memory. Each byte written in FIFO queue 620 is subsequently pulled in succession from this queue in response to an appropriate "TAKE" signal appearing on lead 622 and generated by control logic 640.

The byte-serial output of FIFO queue 620 is routed, via leads 625, to an eight-bit data input (A) of multiplexer 650. Incoming bytes from the cross-point switching matrix that appear on input ($IN_C$) leads $372_1$ are applied to the other eight-bit data input (B) of this multiplexer. This multiplexer, under control of select signals appearing on leads 652 and generated by control logic 640, reconstructs a packet with serial byte-wise data appearing from either FIFO queue 620, if these bytes were routed through the central queue) or alternatively from the cross-point switching matrix, if these bytes were routed through this matrix. The resulting byte-serial data stream appears on lead 655 and is routed to an eight-bit input (A) of multiplexer 660. This multiplexer appends an appropriate two-byte error correcting code value onto each group of 62 successive time-divisionally multiplexed bytes, occurring in successive clock cycles, that have been routed through multiplexer 650. The resulting 64 time-successive bytes form a complete frame. The error correcting code value is generated in the identical manner, as set forth above, by error detecting code generator 680. This generator, using each of the bytes as it appears on leads 655, processes each of these bytes as input, through the same cyclic redundancy code (CRC) polynomial, as used within each receiver as well as in upstream and downstream circuitry of the entire switching circuit. The resulting code value is applied, via leads 682, as input to the other data input (B) of multiplexer 660. The code value is completely constructed while all of the 62 message bytes are being routed through multiplexer 660. Both multiplexer 660 and error detecting code generator 680 are controlled by control logic; the latter through clock and control signals generated by the control logic and appearing on leads 684, and the former through appropriate select signals generated by control logic 640 and appearing on leads 662. Output register 670 synchronizes each output byte produced by multiplexer 660 to the system clock and so applies the synchronized byte as output data to leads 675.

Flow control is performed by flow control logic 690 in response to tokens appearing on lead 692. This logic maintains an internal token count and notifies control logic 640, through leads 695, whether the transmitter has the right to utilize an incoming byte, regardless of its source, i.e. regardless of whether that byte was routed through the cross-point switching matrix or the central queue. As noted above, this count is reset to "31" during system initialization. This count is decremented each time the transmitter accepts an incoming byte and is incremented each time the transmitter supplies a byte (in actuality incremented by two every other time as described above) to its downstream circuitry and obtains therefrom appropriate token(s) on leads 692. In the event the token count reaches zero, control logic 640 refuses to accept any further incoming bytes until the token count is appropriately incremented or reset.

In order to obtain a chunk stored in the central queue, transmitter $380_1$ and specifically through control logic 640 issues a request (REQ_CO), via lead 645 to LRU output arbiter 368, for read (output) access to the central queue. This arbiter, in response to this request and others being simultaneously made by other transmitters, determines whether contention exists for the central queue, i.e., two or more transmitters are simultaneously requesting service). If contention does not exist or if transmitter $380_1$ is to be accorded priority, LRU arbiter 368 issues a grant signal and applies that signal (GRT_CO) to leads 647. In response this grant signal, control logic 640 applies appropriate control signals to shift register 610 to read the chunk then appearing on bus 370. The status of the grant signals specifies the specific transmitter then accorded permission to obtain a memory chunk from the central queue.

LRU arbiter 630, as noted above and shown in FIG. 9 and discussed in detail below), determines, on a least recently used (LRU) basis, which one of the eight receivers is to be accorded access to the cross-point switching matrix at any one time in order to route a chunk therethrough to transmitter $380_1$. This arbiter arbitrates requests for service that appear on leads $374_1$ that originate from each of these receivers (specifically $REQ_{(1,1)}, \ldots, _{(8,1)}$) and generates suitable grant signals ($GRT_{(1,1)}, \ldots, _{(8,1)}$), on leads $376_1$, to identify the particular receiver that has been granted access. Arbiter 630, via leads 632, operates under the control of control logic 640 and appropriately informs the control logic that transmitter $380_1$ is to now receive bytes of a message chunk from the cross-point switching matrix.

Control logic 640, operates in response to a clock signal applied, as input, via lead 642 and control signals applied as input via leads 644. Control logic 640 also generates various control signals on leads 644 for use by other components within the switching circuit. In addition, this control logic generates a variety of other control and clock signals, none of which is particularly relevant here, and applies these signals to leads 648 to control various other aspects of transmitter $380_1$.

Figure 7:
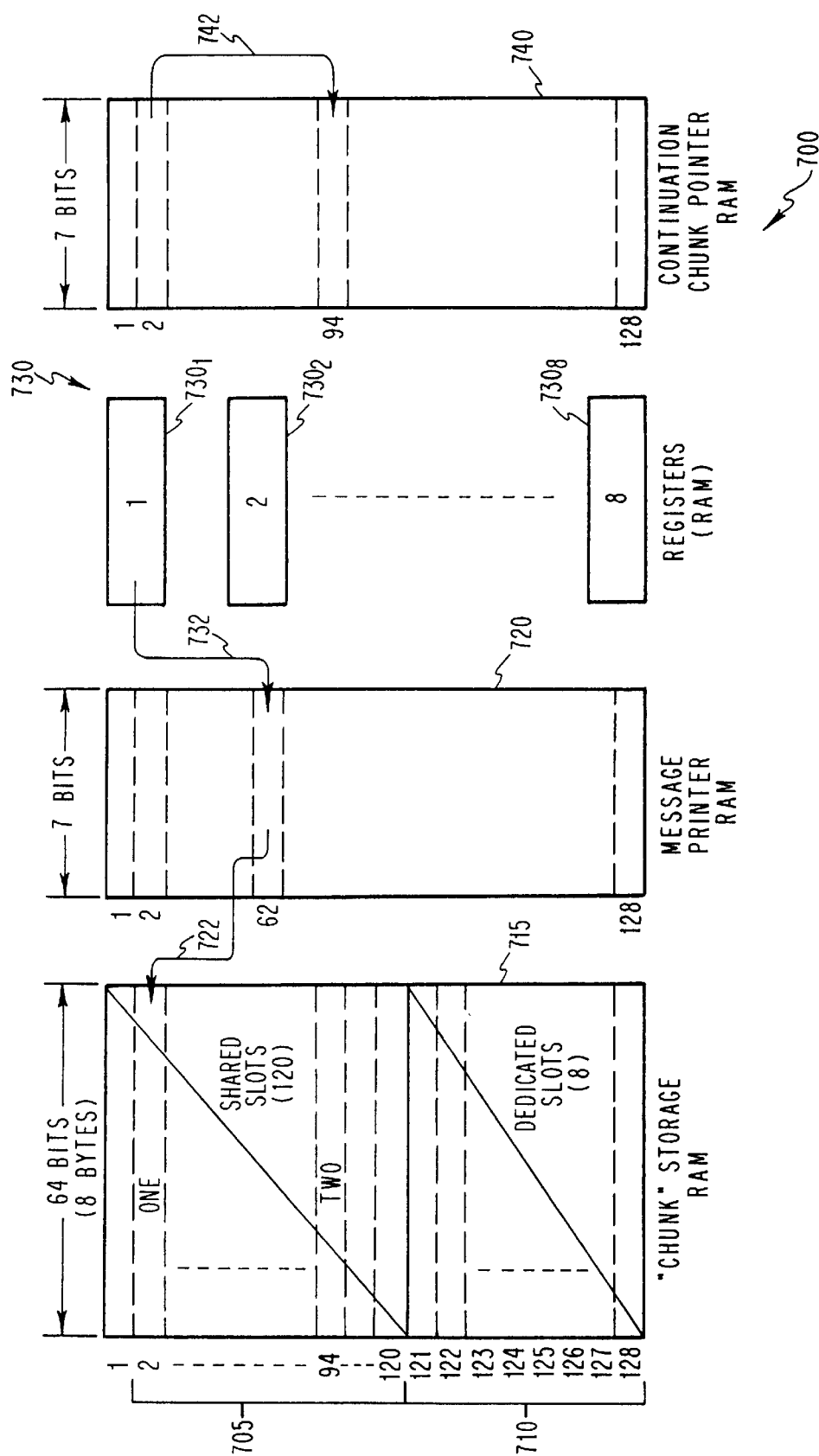
FIG. 7 depicts memory map 700 showing the organization of data stored within central queue 350 also situated within switching circuit $25_1$ shown in FIGS. 3A and 3B.

FIG. 7 depicts memory map 700 showing the organization of data stored within the central queue situated within switching circuit 25₁ shown in FIGS. 3A and 3B. As shown in FIG. 7, the central queue is implemented using four distinct sections of a common random access memory (RAM) circuit. These sections are "chunk" storage RAM 715, message pointer RAM 720, registers 730 and continuation chunk pointer RAM 740. Each of these sections can be located anywhere convenient within the central queue RAM and need not be contiguous. Furthermore, each of these sections does not need to be fully continuous, i.e. occupying one continuous portion of RAM, but can be disjoint as needed. Furthermore, if needed, the central queue RAM can occupy a portion of a much larger RAM circuit that provides additional storage functions—though doing so may be implementationally more complex than using a relatively small dedicated RAM circuit just for the central queue.

As noted above, chunk storage RAM section 715 is preferably dimensioned to contain 128 8-byte (64 bit) slots, of which eight of these slots 710 are dedicated, one slot for each output port; and remaining 120 slots 705 are shared among all the output ports with each of the shared slots being dynamically assigned to any one output port as the need arises. The location of each shared slot within chunk storage RAM 715 does not need to be fixed, but can vary as need be. As discussed above message chunks are stored within the shared slots in the form of eight linked lists. Each list stores the chunks that form whatever messages, one or more, are destined for a single corresponding output port.

Message pointer RAM section 720, registers 730 and continuation chunk pointer RAM section 740 are used to dynamically define each of these lists. In particular, message pointer RAM 720 contains 128 7-bit locations. The number of locations that are used within RAM 720 at any one time is given by the number of separate messages stored within chunk storage RAM 715, with each of these locations containing a 7-bit address of a particular slot in RAM 715 that contains the first chunk of a corresponding message that awaits transfer from the central queue. If two messages are stored within chunk storage RAM 715, then the first and second locations within message pointer RAM 720 are respectively used to store an address of the leading chunk associated with the first and second messages, and so forth for all other messages stored within the central queue. As each chunk in a message is transferred out of the shared portion of the central queue, that chunk is pulled from the head of the corresponding list with the address in corresponding location in message pointer RAM 720 being altered accordingly to point to the next chunk to be transferred for that message. Registers 730 contain eight separate 7-bit registers 730₁, 730₂, . . . , 730₈, in which each register is associated with a separate corresponding output port. Each register stores the address of a location in message pointer RAM 720 for the first message to be transferred for the corresponding output port from the shared slots in the central queue. The remaining messages for that port are linked to the first message, and in the order of arrival at the central queue, into a common list. The actual linkage for each successive chunk is stored within continuation chunk pointer RAM 740, which also contains 128 7-bit locations. For a chunk stored at a given slot, e.g. slot 2 (chunk "ONE") within chunk storage RAM 715, the slot at the same relative address but within continuation chunk pointer RAM 740 contains an address pointer (here for relative address value "94") to the slot within chunk storage RAM 715 that contains the next successive chunk in the corresponding linked list, e.g. chunk "TWO" at slot 94, and so forth for successive message chunks in the same list. The resulting linkage between slots 2 and 94 is represented by line 742.

The last message in any list has a null value in the appropriate slot in continuation chunk pointer RAM 740. As a message chunk is added to any list, the null value stored within RAM 740 for what was the last chunk in that list is changed to point to the slot at which this latest chunk is stored in order to lengthen this list, and so forth. However, if only one message is stored within chunk memory RAM 715, then the corresponding register in registers 730, rather than the message pointer RAM, merely stores the starting address of this sole message.

For purposes of illustration, assume there are two messages stored within chunk storage RAM 715, if the first of these two messages (chunk "ONE") is destined to the first output port but is the 62nd message then existing within the central queue, register 730₁ would store an address (here relative value "62") pointing, as symbolized by line 732, to the 62nd location in message pointer RAM 720. This location, in turn, would contain a 7-bit address (here relative value "2") that points, as symbolized by line 722, to the location of this first chunk within chunk storage RAM section 715. To simplify this figure, the other message is not shown.

Figure 8:
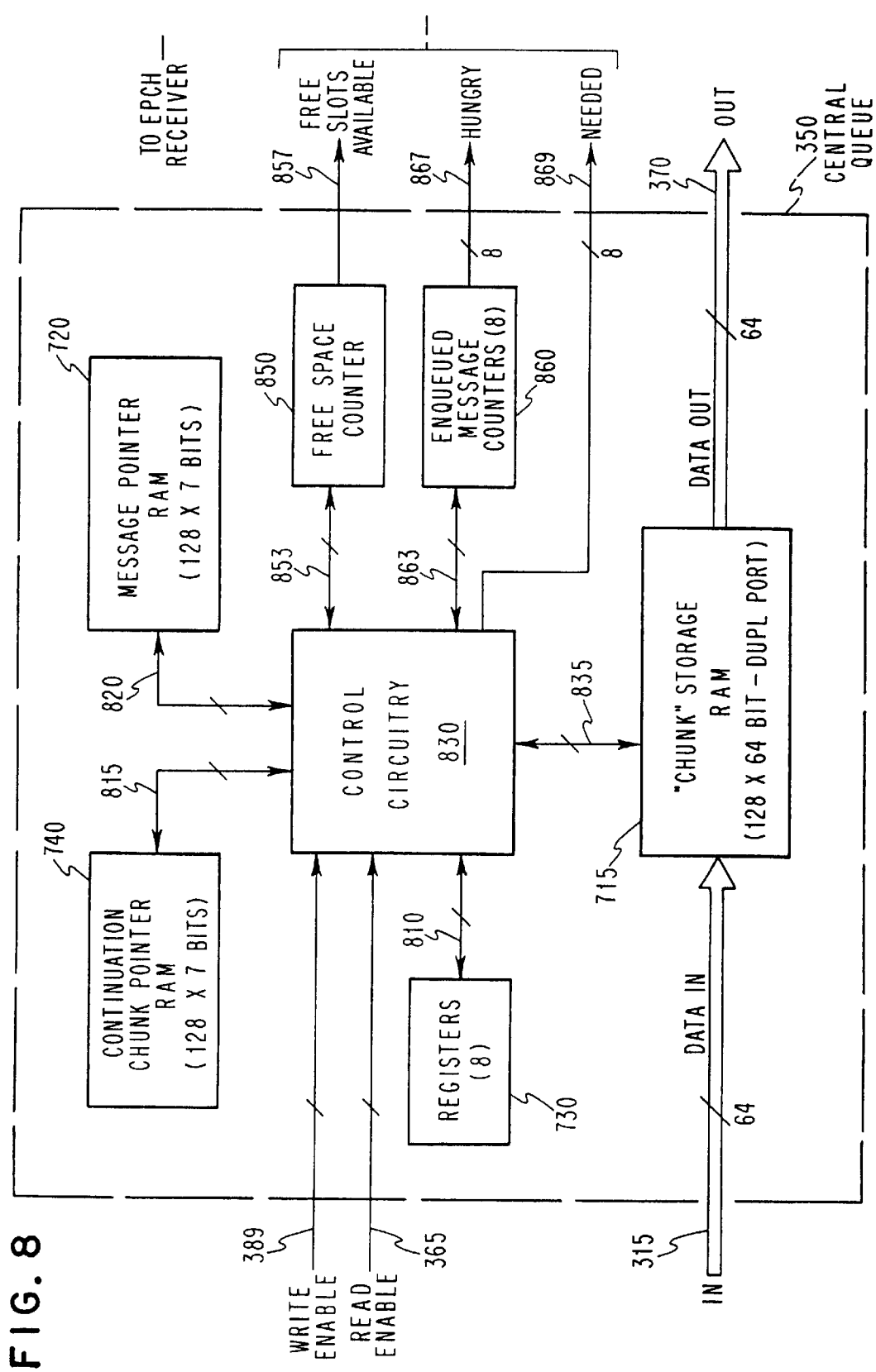
FIG. 8 depicts a high level block diagram of central queue 350 shown in FIGS. 3A and 3B.

FIG. 8 depicts a high level block diagram of central queue 350 shown in FIGS. 3A and 3B. For convenience, the reader should also simultaneously refer to FIG. 7 throughout the following discussion.

As shown, the central queue contains eight registers 730, 128-by-7-bit continuation chunk pointer RAM 740, control circuitry 830, 128-by-7-bit message pointer RAM 720, free space counter 850, eight enqueued message counters 860 and 128-by-64-bit chunk storage RAM 715. Chunk storage RAM 715, message pointer RAM 720, registers 730 and continuation chunk register 740 are connected to control circuitry 830 through leads 835, 820, 810 and 815, respectively. Circuitry 830, in response to the status of each of these components and to various clocking and control signals (not shown), controls the operation of all the individual components that form the central queue.

Incoming chunks are routed over bus 315 as incoming 64-bit data (IN) for storage into chunk storage RAM 715. Chunks read out of this RAM are applied over 64-but bus 370 as output data (OUT). As described above, grant signals, specifically the three-bit address signals therein, appearing on leads 365 and 389 are applied to control circuitry 830 to form a memory address to access the appropriate slot within the central queue in order to then undertake a memory read or write operation, respectively, involving the central queue.

Free space counter 850 maintains a count of the total number of available slots in the shared section of the central queue. This count is applied over leads 857 to each of the receivers as part of the status information from the central queue. Enqueued message counters 860 contain eight separate counters; each of these counters maintains a count of the messages that are currently queued in the central queue for a corresponding output port. This count is used by control circuitry 830. This counter also provides eight separate output signals, labeled "HUNGRY". In particular, if no messages are currently queued for a corresponding transmitter, then the output signal ("HUNGRY") produced by counters 860 for that transmitter is appropriately asserted. This serves as an indication to the classifier circuit in each receiver that this particular transmitter is available and any chunk at the head of any list and then destined to this particular transmitter should be classified accordingly for expedited routing thereto. This signal ("HUNGRY") is sent to each of the receivers as part of the status information from the central queue. Lastly, control circuitry 830 produces eight signals labeled "NEEDED" on leads 869 with one signal for each corresponding output port. For message being routed to any of these output ports, the associated NEEDED signal, when asserted, specifies, for all continuation chunks, that all previous chunks in the message have been transferred through the switching circuit and therefore the next chunk, for this message and which is then awaiting routing at the receiver, is needed at that output port as soon as possible and should be classified accordingly for expedited routing ahead of any other chunk for that port.

A high level block diagram of least recently used (LRU) arbiter 630 situated within transmitter 380$_1$ shown in FIG. 6 is depicted in FIGS. 9A and 9B; for which the correct alignment of the drawing sheets for these latter figures is depicted in FIG. 9. Since, as noted above, switching circuit 25$_1$ (see FIGS. 3A and 3B) collectively utilizes ten identical LRU arbiters, then, for purposes of explanation, the following description will only address arbiter 630.

An LRU arbiter can be implemented in a wide variety of different ways, all of which are readily apparent to those skilled in the art. Since our invention does not reside in any specific implementation of the arbiter, the dedicated logic circuitry shown in FIGS. 9A and 9B, which is our preferred implementation for an $N^2$ LRU arbiter, will only be discussed in general terms. Though the size of this implementation grows rapidly, i.e. as the square of the number of request or grant leads, this circuit advantageously requires only a few gate delays to generate the grant signals thereby providing very high speed operation.

In essence, arbiter 630 is fabricated using a triangular sub-matrix of flip-flops 910 (specifically flip-flops 910$_{0,1}$; 910$_{0,2}$, 910$_{1,2}$; ... 910$_{0,7}$; 910$_{1,7}$, 910$_{2,7}$, , , , 910$_{6,7}$) which can be viewed as flip-flops F(i,j) for $0 \leq i < 8$ and $0 \leq j < i$ (where i and j are positive integers). Eight request signals are applied through horizontal leads 920 (specifically leads 920$_0$, 920$_1$, 920$_2$, . . . , 920$_7$) through the circuit to appropriate single inputs of NAND gates 930 (specifically NAND gates 930$_{0,1}$ . . . , 930$_{0,6}$ . . . 930$_{0,7}$, . . . , 930$_{6,7}$). The Q output of the flip-flop at each corresponding location in the sub-matrix is connected to another input of a corresponding one of these NAND gates. A lower triangular half of this matrix is symmetric with the respect to the upper half with the exception being that the corresponding gates within NAND gates 930 are fed with inverted inputs from the flip-flops. Accordingly, only the upper half of the matrix needs to contain flip-flops 910 with the Q and the $\overline{Q}$ of each of these flip-flops separately feeding the inputs of corresponding gates of NAND gates 930 within the upper and lower triangular halves of the matrix. The outputs of each column of these NAND gates are themselves applied to a corresponding AND gate within AND gates 940, specifically AND gates 940$_0$, 940$_1$, . . . , 940$_7$) with the respective output of these AND gates appearing on leads 950 (specifically leads 950$_0$, 950$_1$, . . . , 950$_7$) being the eight grant signals. Thus, each column of the matrix contains an AND gate tree. Each grant signal is fed back as an input to the J input of the flip-flops in a corresponding column and the K input of the flip-flops in a corresponding row, e.g. the grant 2 signal produced by AND gate 940$_2$ is applied to the K inputs of flips-flops 910$_{0,2}$ and 910$_{1,2}$ and to the J inputs of all the flip-flops in the third column (i.e. flip-flop 910$_{2,7}$ and so forth—though the other flip-flops are not explicitly shown).

With this circuit, a client i is given precedence if no other client with a higher priority is then requesting service. Specifically, a low level (0) at the Q output of flip-flop F(i,j) means that client i has precedence over client j. Alternatively, a high level (1) Q output at flip-flop F(i,j) means that client j has precedence over client i. Whenever client i is granted service (a grant signal is generated on its corresponding grant lead), the logic within arbiter 630 sets flip-flops F(i,j) to 1 for all j; i.e. all flip-flops in column i are set such that their Q outputs are 1, and flip-flops F(i,j), for all i (i.e. across row j), are reset such that their Q outputs are zero; with this operation merely repeating with each successive grant.

Figure 10:
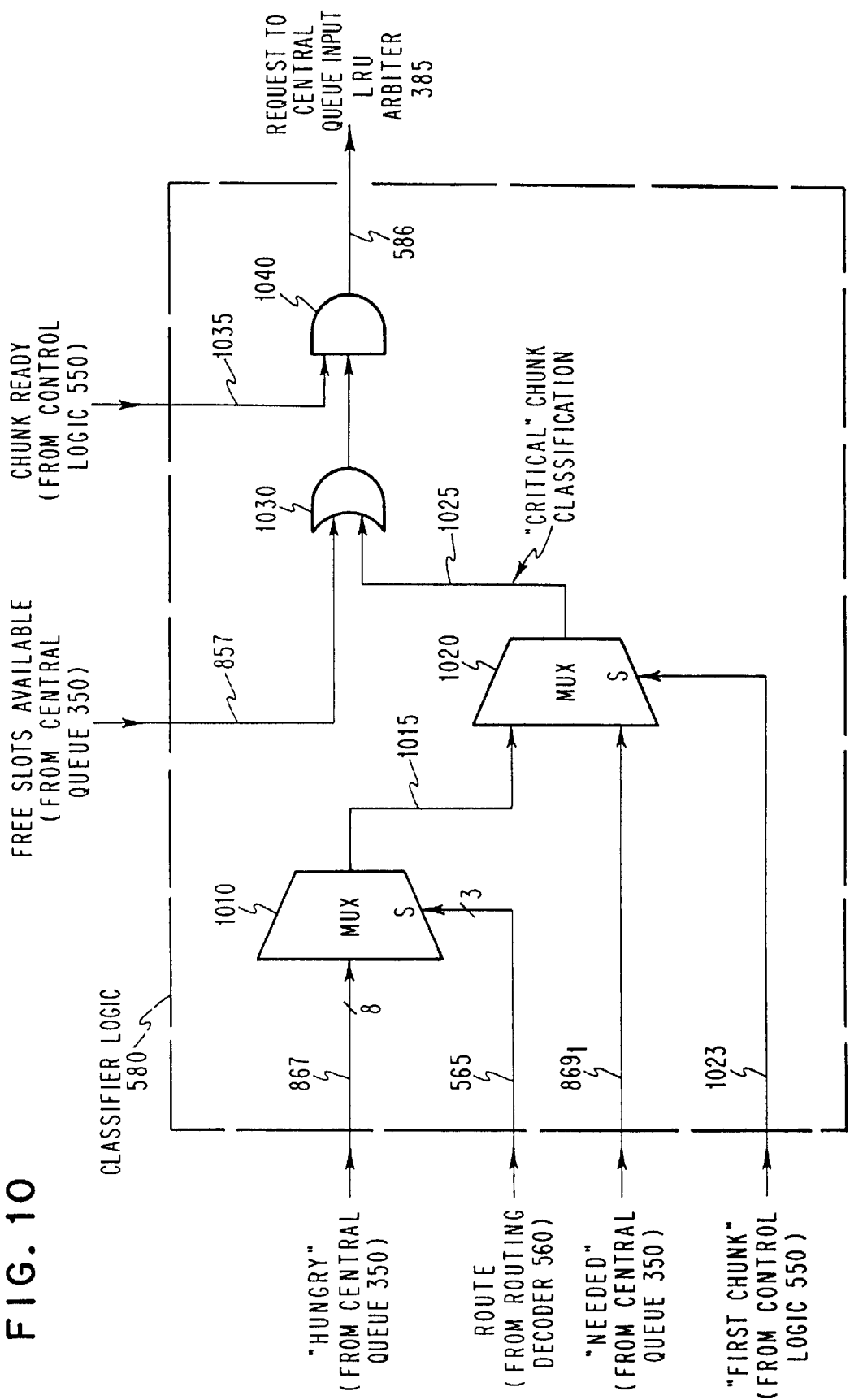
FIG. 10 depicts a high level block diagram of classifier logic 580 situated within receiver $310_1$ shown in FIG. 6.

FIG. 10 depicts a high level block diagram of classifier logic 580 situated within receiver 310$_1$ shown in FIG. 6. As described above, chunks are classified as critical or non-critical. Critical chunks are those which must be routed as soon as possible through the central queue to their destination output ports (transmitters). Non-critical chunks, on the other hand, are those which can wait to be routed. As discussed above, a chunk is classified as critical if it is to be routed to a destination transmitter for which no chunks are currently queued or if that chunk is a continuation chunk, in which case the destination transmitter requires that chunk to be received ahead of any other chunk.

Classifier logic 580 contains multiplexers 1010 and 1020, OR gate 1030 and AND gate 1040. A request for input access to the central queue is generated by AND gate 1040 and appears on lead 586. The request occurs if a chunk is ready to be transferred into the central queue, as specified by the status of a "CHUNK READY" signal generated by control logic 550 situated within receiver 310$_1$ (see FIG. 5 though this signal is not explicitly shown therein) and applied to leads 1035 shown in FIG. 10, and that chunk is either critical or non-critical with, for the latter, a slot then existing within the shared portion of the central queue. In this regard, the status of the "FREE SLOTS AVAILABLE" signal appearing on lead 857 and generated by the central queue specifies, as discussed above, whether any shared slot(s) is then available. This signal is applied to one input of OR gate 1030 and as such propagates through this gate to an input of AND gate 1040. Hence, if a shared slot is then available in the central queue, a request for input access is made as soon as the current chunk is ready to be transferred. Hence, this chunk, being non-critical, is then written into the first available shared slot. Non-critical chunks are thus written into the central queue on a space available basis.

Requests are also generated for critical chunks. Multiplexers 1010 and 1020 classify chunks as critical and, in response, assert the output of multiplexer 1020 high to generate an appropriate request through OR gate 1030 and AND gate 1040. As noted above, a chunk is critical if it the first chunk in a message and nothing is then queued within the central queue for the corresponding destination transmitter or if that chunk is a continuation chunk. In determining the latter, a "FIRST CHUNK" signal is applied from control logic 550 (again see FIG. 5 though this signal is not explicitly shown therein) over lead 1023, as shown in FIG. 10, to a select input of multiplexer 1020. This signal specifies whether the current chunk to be routed is a first chunk of a message or not. The "NEEDED" signal from the central queue is applied to one input of multiplexer 1020 and is selected to propagate through this multiplexer if the current chunk is not the first chunk in the message, i.e. the current chunk is therefore a continuation chunk and hence is critical.

Alternatively, a chunk can also be critical if nothing is currently queued for the transmitter for which that chunk is destined and hence that transmitter is waiting to be used. To determine this particular condition, the eight "HUNGRY" signals produced by each of the transmitters and appearing on leads 867 are applied to corresponding inputs of multiplexer 1010. As discussed above, each of these signals indicates if no messages are currently queued for the corresponding transmitter. The current route (i.e. the three bit address of the destination transmitter) provided by route decoder 560 appearing on leads 565 is used as a select signal to this multiplexer to cause the multiplexer to choose the corresponding single-bit "HUNGRY" signal for the particular destination transmitter for which a chunk is to be written into the central queue. The status of this particular "HUNGRY" signal then appears on lead 1015 and is applied as another input of multiplexer 1020. If nothing is queued for this particular transmitter and hence the "HUNGRY" signal is asserted high, then this level propagates through multiplexer 1010 to multiplexer 1020. If the current chunk is the first chunk in a message, this high level also propagates through multiplexer 1020 with the result that the current chunk is classified as critical and a request is generated therefor.

A packet switch containing our invention, and particularly one suited for use in a massively parallel processing system, has actually been fabricated. This switch contains separate inter-connected bi-directional switching circuits 25 as shown in FIG. 1. Furthermore, a a scalable parallel processing system, specifically system 5 shown in FIG. 1, utilizing these circuits has also been fabricated. As expected, use of the dedicated slots in the central queue coupled with chunk classification effectively prevents deadlock from occurring within the system. Accordingly, each of the bi-directional switching circuits and hence the overall processing system yields excellent system throughput.

By now those skilled in the art clearly realize that although we have described our inventive packet switch as utilizing a central queue that stores 8-byte message chunks, each slot in the central queue could store an entire message. However, doing so would either require limiting the message length to accommodate the size of the slot or, if the size of each slot were to be extended, likely yield inefficient use of reserved space in the central queue. Furthermore, rather than associating each slot in the central queue with an output port (transmitter), either on a dedicated basis in the case of the eight dedicated slots or dynamically in the case of the shared slots, as in the preferred embodiment, these slots could be associated, on a shared or dedicated basis, with corresponding input ports (receivers). However, associating the slots with corresponding input port is likely to much more difficult to implement than associating them with output ports as used in the preferred embodiment.

Also, although we have described our inventive switching circuit 25₁ as having a processing element, such as element 15₁, feeding each input port to this circuit, each input port could just as easily be driven by another switching circuit in order to implement successive packet switching stages. Moreover, should the need arise, some input ports in a given switching circuit could be driven by a prior switching stage with other input ports in the same circuit could be driven by one or more processing elements. Conceivably, a processing element could even drive more than one input port. Furthermore, multiple output ports could be connected, should a need arise, to a common processing element. Similarly, our inventive switching circuit could also be used to drive other switching circuits connected to its output ports rather than just processing elements. In fact, the specific function, i.e. processor or packet switching stage, of the particular source and destination elements connected to the input and output ports of our inventive switching circuit is irrelevant to the operation of our inventive circuit provided these elements utilize packets in the form described above and shown in FIG. 2A.

In addition, rather than utilizing a central queue having both shared and dedicated slots to avoid deadlocks, the central queue could be split with one half of the queue being used to store message chunks (or entire messages) propagating along one direction through a network channel and the other half of the queue being used to store similar traffic but propagating along the opposite direction through that channel. While this would obviate the need for dedicated slots and would permit bi-directional traffic to flow through this queue, this technique would not permit the central queue to route a chunk (or entire message) back to its originating node, as our preferred embodiment can easily do.

Although a preferred embodiment, which incorporates the teachings of our present invention, has been shown and described in detail herein, those skilled in the art can readily devise many other varied embodiments that still incorporate these teachings.

We claim:

1. Apparatus for a packet switch, said apparatus comprising:

a predefined positive integer m of separate receivers for receiving a message having predefined message portions;

a predefined positive integer n of separate transmitters for obtaining said message portions from said receivers;

a classifier for classifying each of said message portions as either a critical message portion or a noncritical message portion on a predefined classification basis;

a queue made up of a number of storage locations, said queue connected to each of said m receivers and said n transmitters, each storage location for storing one of said message portions emanating from one of said receivers and destined to one of said transmitters, said queue having dedicated storage locations and shared storage locations wherein each of said shared storage locations store noncritical message portions destined for any one of said transmitters and each of said dedicated storage locations only stores critical message portions destined for only a particular one of said transmitters and no other transmitters;

a queue arbiter for granting priority of access to particular ones of said transmitters as designated by said critical message portions stored in said dedicated storage locations, said priority of access being over noncritical message portions stored in said shared storage locations;

a by-pass switch having m inputs, each input connected to a respective one of said m receivers, and n outputs, each output connected to a respective one of said n transmitters, said by-pass switch for by-passing message portions from said receivers to said transmitters around said queue, said by-pass switch having a lower latency than said queue; and a selector in each of said receivers responsive to each of said transmitters, for selectively applying a given one of said message portions to either said by-pass switch or said queue for subsequent application therethrough to a designated one of said transmitters, wherein the given one message portion is applied to said by-pass switch if output contention does not then exist for the designated transmitter, otherwise the given one message portion is stored within said queue.

2. The apparatus in claim 1 wherein each of said selectors comprises a request generator for generating a by-pass access request signal in order to request routing said given one message portion through said by-pass switch to the designated one of said transmitters and, in response to status of such by-pass access grant signals generated by all of said transmitters, applying said given one message portion to said by-pass switch, if said status of the by-pass access grant signals indicates that output contention does not then exist for said designated one of said transmitters, or to said queue if said status of the by-pass access grant signals indicates that output contention does exist.

3. The apparatus in claim 2 wherein each of said transmitters comprises a signal generator, responsive to corresponding by-pass access request signals from each of said receivers, for generating a corresponding one of said by-pass access grant signals to each of said receiver means.

4. The apparatus in claim 3 wherein said signal generator is an arbiter.

5. The apparatus in claim 4 wherein said arbiter performs arbitration of said by-pass access request signals applied thereto on a least recently used basis to generate said corresponding one by-pass access grant signal.

6. The apparatus in claim 5 wherein said by-pass switch is a cross-point switching matrix.

7. The apparatus in claim 6 further wherein said queue arbiter is connected to said queue and each of said receivers and transmitters, said queue arbiter for granting access to any one of said receivers to write one of said message portions within said queue and for granting access to any one of said transmitters to extract one of said message portions stored within said queue.

8. The apparatus in claim 7 wherein said selector comprises:
   classifier logic for classifying the given one message portion so as to generate the classification therefor and, in the event said classification indicates that said one incoming message portion should be routed through said queue, generating a queue write access request signal to said queue arbiter to write said one incoming message into said queue; and
   control logic, responsive to a queue write access grant signal generated by said queue arbiter, for selectively applying said given one message portion to an input of said queue in the event said queue write access grant signal signifies that write access to the queue means has then been awarded by said queue arbiter to a designated one of said receivers to transfer said one message portion into said queue.

9. The apparatus in claim 1 wherein each respective transmitter further comprises:
   control logic for generating a queue read access request signal to obtain a message portion stored within said queue and destined for this respective transmitter; and
   further control logic, operative in response to a queue access read grant signal, for accepting a message portion then provided by said queue.

10. The apparatus in claim 1 wherein said queue further comprises a plurality of linked lists, wherein message portions, written into shared locations and destined for designated ones of said transmitters, are stored in a separate corresponding one of the linked lists with a most recent one and a least recent one of said message portions in said one list being situated at a tail and a head, respectively, of said one list and message portions being sequentially read from said one list in an order of arrival therein.

11. The apparatus in claim 1 wherein n and m are both the same; all of said receivers are identical; and all of said transmitters are identical.

12. Apparatus for a packet switch, said apparatus comprising:
   a plurality of separate receivers each for receiving a predefined portion of a message and each said receiver having a buffer for reception and transmission of said message portions;
   a plurality of separate transmitters for obtaining said message portions from said separate receivers for forming messages of the portions so obtained;
   a queue connected to each receiver of said plurality of receivers and each transmitter of said plurality of transmitters for storing said message portions in the event the transmitter to which a message portion is intended is then unavailable to accept such message portion, said queue having a first plurality of shared storage locations wherein each said shared storage location receives message portions from any of said receivers for any said transmitters so that each said shared storage location is shared among all of said transmitters so as to store message portions destined for any of said transmitters, said queue also having a second plurality of dedicated stored locations, each transmitter in the plurality of separate transmitters having at least one dedicated storage location dedicated permanently thereto wherein each said dedicated storage location receives message portions from any one of said receivers for only an associated one of said transmitters so that each said dedicated storage location is dedicated to storing message portions destined for the particular associated one of said transmitters and no other of said transmitters;
   a classifier for selectively placing each said message portion into a shared storage location or a dedicated storage location based upon classification of each message portion either as noncritical or critical respectively;
   logic for each respective receiver for maintaining message portions to be placed in a shared location in said buffer of said respective receiver when all said shared locations are full; and
   logic for each transmitter for accessing message portions from the dedicated storage location associated with each such transmitter prior to accessing any message portions from any shared storage location.

13. The apparatus in claim 12 wherein said apparatus further comprises:
   a by-pass switch, connected to each receiver of said plurality of separate receivers and each transmitter of said plurality of transmitters, for routing selected one of said message portions between said receivers and and a selected one of said transmitters so said selected message portions by-pass the queue, said by-pass switch having a lower latency than said queue; and
   a selector in each of said receivers responsive to each of said transmitters, for selectively applying a given one of said message portions to either said by-pass switch or said queue for subsequent application therethrough to a designated one of said transmitters, wherein the given one message portions is applied to said by-pass switch if output contention does not then exist for the designated transmitter.

14. The apparatus in claim 13 including an arbiter for selecting said selected ones of said message portions from contending message portions for transmission on said by-pass switch on the basis of selecting the message portion from the least recently serviced receiver.

15. The apparatus of claim 14 including a queue input arbiter for selecting between message portions to be placed in said shared locations on the basis that a message portion from the receiver which had a previous message portion least recently transferred shall be transferred first.

16. The apparatus of claim 15 including a queue output arbiter for selecting between message portions in said shared locations for transfer to said transmitters on the basis that a message portion from the transmitter which had a message portion least recently transferred shall be transferred first.

17. In a massively parallel network of processors in which processors are arranged in a plurality of multiprocessor nodes where each processor at a processor node is connected to other processors at that same processor node through a set of packet switches for receipt and transmission of messages and packet switch sets of different nodes are interconnected for the passage of messages therebetween, a method of operating each packet switch comprising:

providing for transferring predefined portions of a message from a plurality of separate receivers to a plurality of separate transmitters of such a packet switch through a queue having both dedicated storage locations dedicated to storing message portions destined for only one of the transmitters of the plurality of separate transmitters and shared storage locations for storing message portions for any one of the plurality of separate transmitters;

providing for classifying each message portion as either critical or noncritical;

providing for storing only message portions classified as critical into said dedicated storage locations and storing message portions classified as noncritical into shared storage locations;

providing for selecting for transfer to a designated one of said transmitters any message portion stored in a dedicated storage location for said designated one of said transmitters prior to selecting for such transfer to the same transmitter any message portion stored in a shared storage location;

providing for routing, through a by-pass switch having a lower latency than said queue means, selected ones of said message portions between each of said receivers and each of said transmitters so as to by-pass the queue; and actually transferring said message portions to either said by-pass switch or said queue for subsequent application therethrough to said designated one of said transmitters, depending on whether contention then exists for the designated transmitter.

18. The method of claim 17 including the step of selecting between message portions to be placed in said shared locations by a selected one of said receivers by selecting first a message portion from said selected receiver that had a message least recently transmitted to a transmitter means.

19. The method of claim 17 further comprising the steps of:

selecting between message portions contending for such routing on the basis of the selection of the message from the least recently serviced receiver means.

20. In a scalable parallel processing network of processors in which the processors are arranged in a plurality of multiprocessor nodes with each processor at a node connected to all the other processors at that node through a set of packet switches for the receipt and transmission of messages and in which all packet switch sets are interconnected to couple every processor in the network to every other processor in the network, an improved bidirectional packet switch for routing messages in packets comprising:

a plurality of separate receivers each for receiving predefined message portions from a corresponding one of said nodes;

a plurality of separate transmitters for receiving message portions from said receivers and transmitting them to a corresponding one of said nodes;

a queue formed of a plurality of storage locations, wherein said queue is connected to each receiver of said plurality of receivers and each transmitter of said plurality of said transmitters, said storage locations for storing said message portions in the event a transmitter is then unavailable to accept a message portion an arbiter for each transmitter in said plurality of separate transmitters for accessing message portions from the storage locations associated with that transmitter;

a by-pass switch, connected to each receiver of said plurality of separate receivers and each transmitter of said plurality of transmitters, for routing selected ones of said message portions between said receivers and a designated one of said transmitters so said selected message portions by-pass the queue; and a selector in each of said receivers responsive to each of said transmitters, for selectively applying a given one of said message portions to either said by-pass switch or said queue for subsequent application therethrough to said designated one of said transmitters, wherein the given one message portion is applied to said by-pass switch if output contention does not then exist for the designated transmitter.

* * * * *